United States Patent
Kawaguchi et al.

(10) Patent No.: US 8,934,757 B2
(45) Date of Patent: Jan. 13, 2015

(54) CONTENT DISTRIBUTION SYSTEM, PLAYBACK DEVICE, DISTRIBUTION SERVER, PLAYBACK METHOD, AND DISTRIBUTION METHOD

(75) Inventors: Toru Kawaguchi, Osaka (JP); Hiroki Shinohara, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/522,584

(22) PCT Filed: Jun. 22, 2011

(86) PCT No.: PCT/JP2011/003555
§ 371 (c)(1),
(2), (4) Date: Jul. 17, 2012

(87) PCT Pub. No.: WO2011/161957
PCT Pub. Date: Dec. 29, 2011

(65) Prior Publication Data
US 2012/0294587 A1     Nov. 22, 2012

(30) Foreign Application Priority Data
Jun. 23, 2010  (JP) .............................. 2010-142718

(51) Int. Cl.
| | | |
|---|---|---|
| H04N 13/00 | (2006.01) | |
| H04N 21/434 | (2011.01) | |
| H04N 21/84 | (2011.01) | |
| H04N 21/81 | (2011.01) | |
| H04N 13/04 | (2006.01) | |

(52) U.S. Cl.
CPC ....... *H04N 13/0066* (2013.01); *H04N 13/0029* (2013.01); *H04N 13/0048* (2013.01); *H04N 19/0769* (2013.01); *H04N 21/4345* (2013.01); *H04N 21/84* (2013.01); *H04N 13/0059* (2013.01); *H04N 21/4347* (2013.01); *H04N 21/816* (2013.01); *H04N 13/0438* (2013.01); *H04N 13/0452* (2013.01)
USPC ........................................................ 386/248

(58) Field of Classification Search
USPC .......................................................... 386/248
See application file for complete search history.

(56) References Cited

U.S. PATENT DOCUMENTS

| | | | |
|---|---|---|---|
| 6,925,250 B1 | 8/2005 | Oshima et al. | |
| 2010/0086285 A1* | 4/2010 | Sasaki et al. | 386/108 |
| 2010/0142924 A1* | 6/2010 | Yamashita et al. | 386/95 |
| 2010/0303442 A1* | 12/2010 | Newton et al. | 386/241 |
| 2010/0303444 A1* | 12/2010 | Sasaki et al. | 386/248 |
| 2011/0090304 A1* | 4/2011 | Song | 348/42 |

FOREIGN PATENT DOCUMENTS

| | | |
|---|---|---|
| JP | 11-191895 | 7/1999 |
| JP | 2004-166160 | 6/2004 |

(Continued)

OTHER PUBLICATIONS

International Search Report issued Sep. 13, 2011 in corresponding International Application No. PCT/JP2011/003555.

*Primary Examiner* — Thai Tran
*Assistant Examiner* — Nien-Ru Yang
(74) *Attorney, Agent, or Firm* — Wenderoth, Lind & Ponack, L.L.P.

(57) ABSTRACT

A content distribution system inhibits execution of processing which is unnecessary for streams having specific structures. The content distribution system includes a distribution server and a playback apparatus. The distribution server transmits a program stream and a program state flag associated with the program stream that indicates whether or not program content corresponding to the program stream is constituted of only 3D video. The playback apparatus determines, prior to decoding the program stream, whether or not the program state flag indicates that the program content is constituted of only 3D video, and when determining that the program content is constituted of only 3D video, decodes the program stream and performs control so as to play back the program stream as 3D video without determining whether or not each frame included in the program stream is a 3D video frame.

4 Claims, 19 Drawing Sheets

(56) References Cited

FOREIGN PATENT DOCUMENTS

| | | |
|---|---|---|
| JP | 2004-200813 | 7/2004 |
| JP | 2004-240469 | 8/2004 |
| JP | 2005-6114 | 1/2005 |
| JP | 2005-94168 | 4/2005 |
| JP | 2012-4774 | 1/2012 |

\* cited by examiner

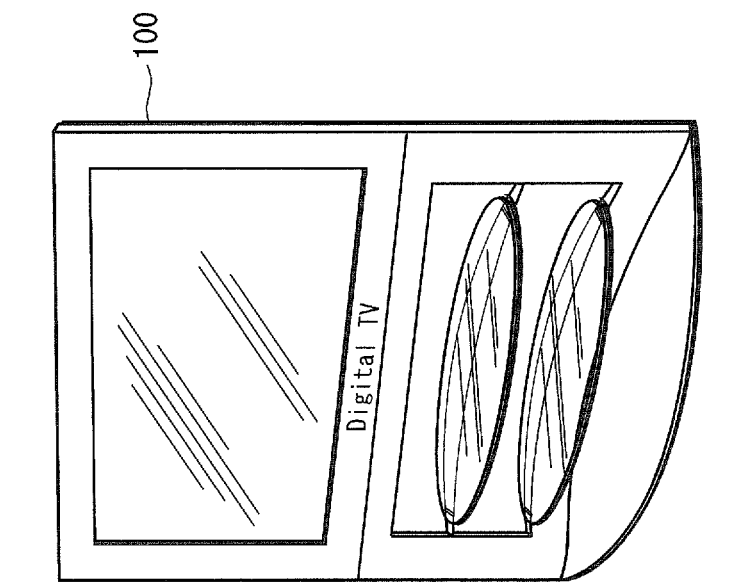
FIG. 1A
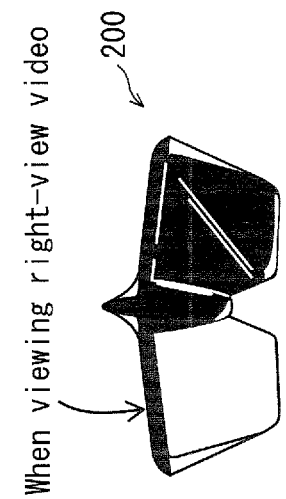
FIG. 1C When viewing right-view video
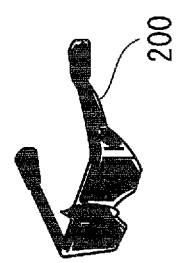
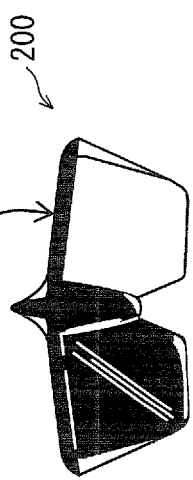
FIG. 1B When viewing left-view video

FIG. 18A

```
<es_info>
  <video_info resolution="1" coding="avc">
    <s3d_frame_compatible structure="sbs" signaling="XXXX">true</s3d_frame_compatible>─321a
  </video_info>
  ...
</es_info>
```

XXXX { true : Refer
       false : Do not refer

FIG. 18B

```
<es_info>
  <video_info resolution="1" coding="avc">
    <s3d_frame_compatible structure="sbs" beginning="YY">true</s3d_frame_compatible>─321b
  </video_info>
  ...
</es_info>
```

YY { 2d : Initial frame is 2D video frame
     3d : Initial frame is 3D video frame

FIG. 18C

```
<content_chapter_info>
  <chapter number="1" >
    <chapter_point beginning="ZZ" >300.0</chapter_point>─322
  <chapter>
  ...
</content_chapter_info>
```

ZZ { 2d : Head portion of chapter is 2D video frame
     3d : Head portion of chapter is 3D video frame

FIG. 19

```
┌ Example of file description ─────────── 330a
│   <eri>
│     <header>
│       ⋮
│     </header>
│     <startup>
│       ⋮
│     </startup>
│     <content_chapter_info>
│       ⋮
│     </content_chapter_info>
│     <es_info>
│       ⋮
│     </es_info>                          331a
│     ┌─────────────────────────────────┐
│     │ <stereoscopic_info>             │
│     │  ┌────────────────────────────┐ │
│     │  │ <stereoscopic_format>side_by_side
│     │  │ </stereoscopic_format>     │ │
│     │  └────────────────────────────┘ │
│     │   <structure_3d2d>zzzzzzzz   332a
│     │   </structure_3d2d>             │
│     │   <stereoscopic_info>         333a
│     └─────────────────────────────────┘
│   </eri>
└────────────────────────────────────────
``` zzzzzzzz
- entire3d : Entire video is 3D video
- partial3d_start3d : Part of video is 3D video and head portion is 3D video
- partial3d_start2d : Part of video is 3D video and head portion is 2D video

CONTENT DISTRIBUTION SYSTEM, PLAYBACK DEVICE, DISTRIBUTION SERVER, PLAYBACK METHOD, AND DISTRIBUTION METHOD

BACKGROUND OF INVENTION

1. Technical Field

The present invention relates to a technology for displaying 2D and 3D video.

2. Description of the Related Art

The technology disclosed in Patent Literature 1 and the like is conventionally known as technology for reproducing and displaying stereoscopic images on digital televisions and the like.

More specifically, Patent Literature 1 discloses a technology of providing, to each frame constituting a stream to be sequentially broadcasted, identification information identifying whether a given frame is a 2D video frame or a 3D video frame. A playback apparatus playing back video determines whether a given frame is a 2D video frame or a 3D video frame by referring to the identification information provided thereto and performs playback of 2D video or 3D video according to the result of the determination.

CITATION LIST

Patent Literature

[Patent Literature 1]
Japanese Patent Application Publication No. 2005-094168

SUMMARY OF INVENTION

Here, presumption is made of a case where a stream distributed via a network, such as the internet, is constituted of only 3D video frames and therefore, does not include any 2D video frames. When a 3D movie stream having such a structure is played back by applying the method disclosed in Patent Literature 1, reference is made to identification information provided to each of the frames constituting the stream even though such referencing is unnecessary.

In view of such a problem, one aim of the present invention is to provide a content distribution system, a playback apparatus, a distribution server, a playback method, and a distribution method, which inhibit execution of processing that is unnecessary for streams having specific structures.

So as to achieve the aim presented in the above, the present invention provides a content distribution system including a distribution server that distributes a program stream pertaining to program content and a playback apparatus that decodes and plays back the program stream, the distribution server and the playback apparatus being connected via a network, the distribution server comprising: a distribution unit that distributes, to the playback apparatus via the network, the program stream and a program state flag associated with the program stream, the program state flag indicating whether or not the program content is constituted of only 3D video, and the playback apparatus comprising: a reception unit that receives, from the distribution server, the program stream and the program state flag; a determination unit that determines, prior to decoding of the program stream, whether or not the program state flag indicates that the program content is constituted of only 3D video; and a playback unit that decodes the program stream and that performs control so as to play back the program stream as 3D video without determining whether or not each of frames included in the program stream is a 3D video frame when the determination unit determines that the program state flag indicates that the program content is constituted of only 3D video.

According to this structure, the distribution server of the content distribution system transmits the program stream and the program state flag to the playback apparatus. The playback apparatus decodes and plays back the program stream without determining whether or not each of the frames included in the program stream is a 3D video frame when determining, prior to decoding the program stream, that the program content corresponding to the program stream is constituted of only 3D video by using the program state flag. As such, when program content constituted of only 3D video is distributed as a single distribution-target content in a content distribution service, the content distribution system inhibits the execution of the processing of determining whether or not each of the frames included in the program content is a 3D video frame.

BRIEF DESCRIPTION OF THE DRAWINGS

FIGS. 1A-1C illustrate a form of usage of a digital television (playback apparatus) 100.

FIG. 18 illustrates a modification of the data structure of the playback control file.

FIG. 19 illustrates a modification of the data structure of the playback control file (specification of an initial frame of a content piece).

DETAILED DESCRIPTION OF INVENTION

1. First Embodiment

Figure 2:
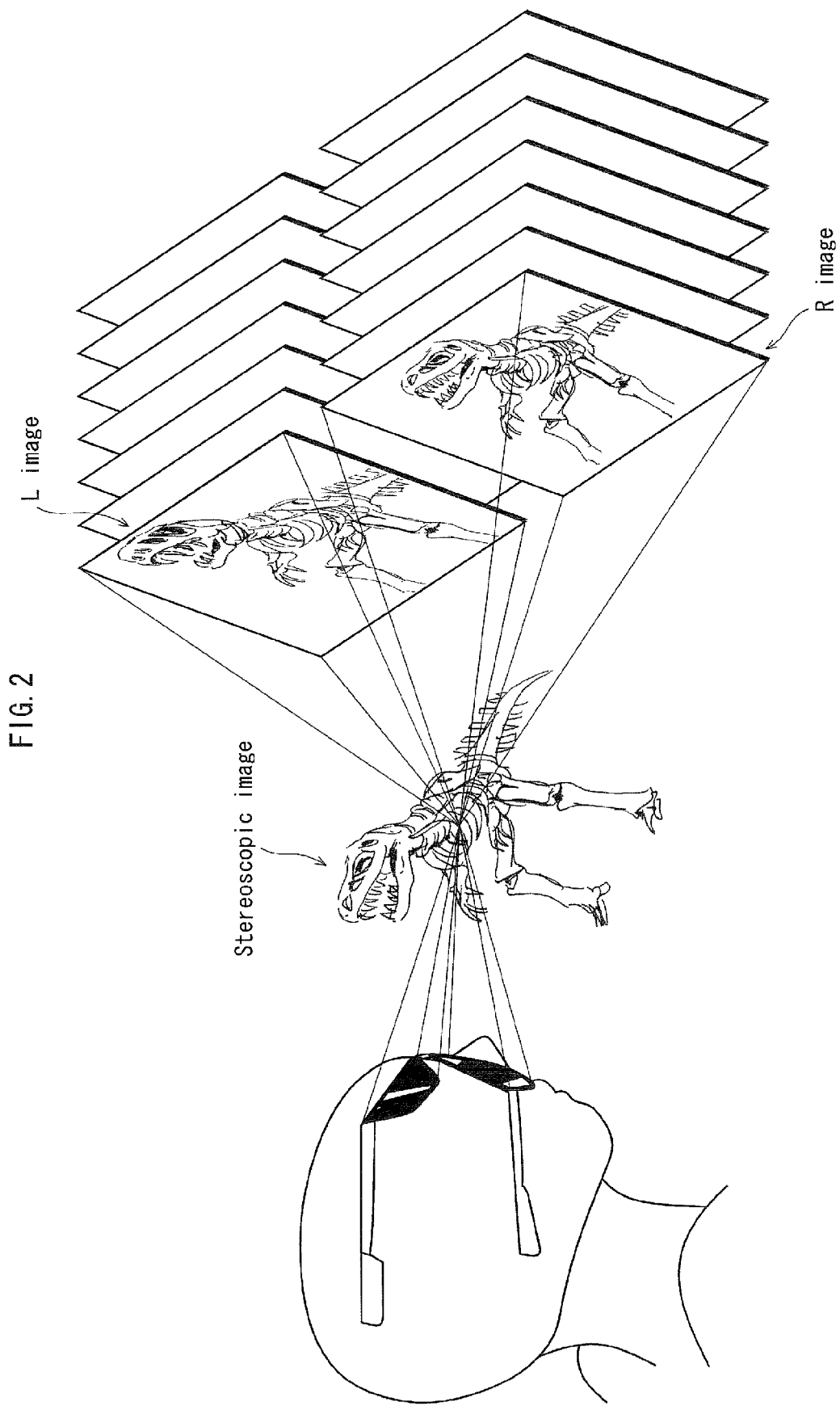
FIG. 2 illustrates an example of how a stereoscopic image is displayed.

In the following, explanation is provided of a content distribution system pertaining to the present embodiment with reference to the accompanying drawings. The content distribution system pertaining to the present embodiment is constituted of a distribution server that performs distribution of content and a playback apparatus that performs playback of the distributed content.

1.1 Stereoscopic Viewing

First, a brief explanation is provided of the principles of stereoscopic viewing. Stereoscopic viewing is realized by using an integral imaging method such as a holographic technology or a method using parallax images.

The first method of applying holographic technology is characterized in that objects are recreated stereoscopically and are perceived by humans in exactly the same way as when viewing objects in everyday life. However, although the generation of moving pictures according to this technology is possible in theoretical grounds, there are several requirements which need to be satisfied to actually realize holographic display. That is, a computer which is capable of performing an enormous amount of calculation for realtime generation of moving images is required and a display device having a graphic resolution sufficient for displaying thousands of lines drawn within a single-millimeter space are required. Since such requirements are extremely difficult to satisfy at present, there are few, if any, examples of commercial realization of the holographic technology.

Subsequently, explanation is provided of the second method of applying parallax viewing. Generally, due to the positional difference between the right eye and the left eye, there is a slight difference between an image viewed by the right eye and an image viewed by the left eye. It is by utilizing this difference, also called parallax, that humans are able to perceive images appearing in the eyes as stereoscopic images. By performing stereoscopic displaying of parallax images, planar images are perceived by the human eyes as if the images were stereoscopic, by parallax.

This method is advantageous in that stereoscopic viewing can be realized simply by preparing two images of different perspectives, one for the right eye and one for the left eye. Here, importance lies in ensuring that an image corresponding to the left or right eye is made visible to only the corresponding eye. As such, several technologies applying this method, including the alternate-frame sequencing method, have been put into practical use.

The alternate-frame sequencing method is a method where left-view images and right-view images are displayed in alternation along the chronological axis direction. The images displayed in alternation in such a manner cause the left and right scenes to overlap each other in the viewer's brain due to an afterimage effect, and thus are perceived as stereoscopic images.

A playback apparatus pertaining to the present embodiment is a television capable of displaying 3D video. FIG. 1A illustrates a form of usage of the playback apparatus. As illustrated in FIG. 1A, the playback apparatus includes a digital television 100 and 3D glasses 200, which are used by a user in combination.

The digital television 100 is capable of displaying 2D video and 3D video, and displays video by playing back streams that are included in broadcast waves received thereby.

The digital television 100 of the present embodiment realizes stereoscopic viewing by having the user wear the 3D glasses 200. The 3D glasses 200 include liquid crystal shutters, and enable the user to view parallax images through alternate-frame sequencing. A parallax image is a pair of images composed of an image for the right eye and an image for the left eye and enables stereoscopic viewing by having each eye of the user view only the image corresponding thereto. FIG. 1B shows the state of the 3D glasses 200 when a left-view image is being displayed. At the moment when a left-view image is displayed on the screen, the aforementioned 3D glasses 200 make the liquid crystal shutter corresponding to the left eye transparent and make the liquid crystal shutter corresponding to the right eye opaque. FIG. 1C shows the state of the 3D glasses 200 when a right-view image is being displayed. At a moment when a right-view image is displayed on the screen, in a reversal of the above, the liquid crystal shutter corresponding to the right eye is made transparent and the liquid crystal shutter corresponding to the left eye is made opaque.

This concludes the explanation of the form of usage of the playback apparatus.

In the following, explanation is provided of a method of displaying parallax images for stereoscopic viewing.

Stereoscopic viewing applying the parallax image method involves preparing respective pictures for the right eye and the left eye and displaying such pictures so that each eye sees only pictures corresponding thereto in order to achieve the stereoscopic effect. FIG. 2 shows the head of a user on the left-hand side, and, on the right-hand side, an example of a dinosaur skeleton as viewed by the left eye as well as by the right eye. By repeatedly alternating the transparency and opacity for the left and right eyes, the user's brain is made to combine the views of each eye from afterimage effects, resulting in the perception that a stereoscopic object exists along an imaginary line extending from the middle of the face.

In the context of parallax images, images viewed by the left eye are called left-view images (L-images) and images viewed by the right eye are called right-view images (R-images). Furthermore, a motion picture in which each picture is an L-image is called the left-view video and a motion picture in which each picture is an R-image is called the right-view video.

There exist 3D methods in which the left-view video and the right-view video are combined and compression-coded, such as the frame compatible method and the service compatible method.

Figure 3:
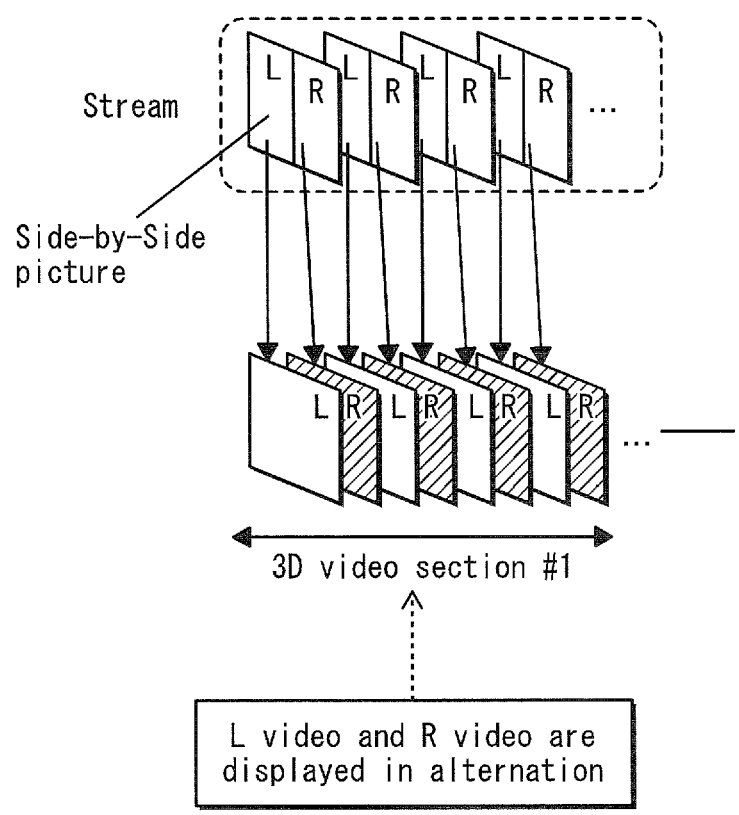
FIG. 3 illustrates an example of how video in the Side-by-Side format is displayed.

The first of these, the frame-compatible method, involves shrinking or extracting lines from each of the pictures corresponding to the left-view video and the right-view video so as to combine the pictures into one, and is performed using ordinary motion picture compression-coding methods. An example of this is the Side-by-Side format as illustrated in FIG. 3. The Side-by-Side format shrinks each of the pictures corresponding to the left-view video and the right-view video by ½ in the horizontal direction and lines up the results side by side to form a single picture. A stream is yielded from the motion picture made up of pictures so formed by performing ordinary motion picture compression-coding. On the other hand, during playback, the stream is decoded into a motion picture according to ordinary motion picture compression-coding methods. Further, each picture within the decoded motion picture is split into left and right images which are respectively expanded in the horizontal direction by a factor of two to obtain the pictures corresponding to the left-view video and the right-view video. The images so obtained of the left-view video (L-images) and the right-view video (R-images) are displayed in alternation. Thus, as illustrated in FIG. 2, a stereoscopic image can be obtained therefrom. Aside from the Side-by-Side format, the frame-compatible method can be achieved using the Top-and-Bottom format, in which the L and R images are aligned vertically, or the Line Alternative format, in which the lines within each picture are interleaved lines from the L and R images, and the like.

Subsequently, explanation is provided of the service compatible method. The service compatible method is realized by using a left-view stream and a right-view stream respectively yielded by digitalizing and compression-coding left-view video and right-view video.

Figure 4:
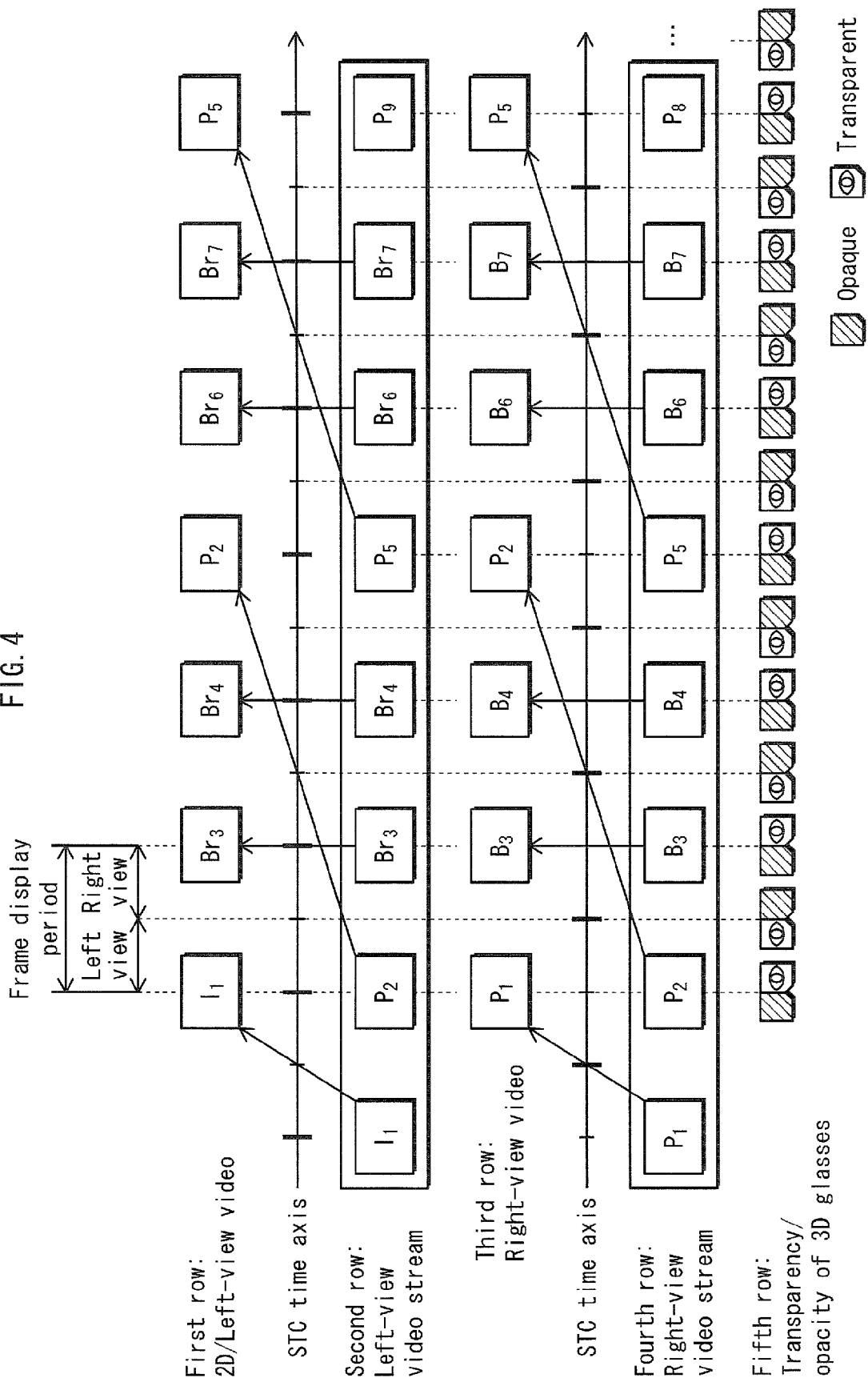
FIG. 4 illustrates an example of a structure of frames for stereoscopic viewing.

FIG. 4 illustrates an example of the internal structure of the left-view and right-view streams used in the service compatible method for realizing stereoscopic viewing.

The second row of FIG. 4 shows the internal structure of the left-view stream. In specific, the left-view stream includes the picture data I1, P2, Br3, Br4, P5, Br6, Br7, and P9. These pictures are decoded in accordance with the Decode Time Stamp (DTS). The top row shows the left-view images. The left-view images are played back by playing back the decoded picture data I1, P2, Br3, Br4, P5, Br6, Br7, and P9 in the order of I1, Br3, Br4, P2, Br6, Br7, and P5 in accordance with the Presentation Time Stamp (PTS). In FIG. 4, a picture to which intra-picture coding is applied without the use of a reference picture is called an I-picture. Here, note that a picture is defined as a unit of encoding that encompasses both frames and fields. Also, a picture to which inter-picture coding is applied with reference to one previously-processed picture is called a P-picture, a picture to which inter-picture predictive coding is applied with reference to two previously-processed pictures at once is called a B-picture, and a B-picture referenced by other pictures is called a Br-picture.

The fourth row of the FIG. 4 shows the internal structure of the right-view stream. This right-view stream includes picture data P1, P2, B3, B4, P5, B6, B7, and P8. These picture data are decoded in accordance with the DTS. The third row shows the right-view images. The right-view images are played back by playing back the decoded picture data P1, P2, B3, B4, PS, B6, B7, and P8 in the order of P1, B3, B4, P2, B6, B7, and P5 in accordance with the PTS. Here, it should be noted that stereoscopic playback by alternate-frame sequencing displays one of the pair sharing the same PTS, i.e. either the left-view image or the right-view image, with a delay equal to half the PTS interval (hereinafter referred to as a "3D display delay") following the display of the image of the other perspective.

The fifth row shows how the 3D glasses 200 change between different states thereof. As shown in the fifth row, the right-eye shutter is closed whenever left-view images are viewed, and the left-eye shutter is closed whenever right-view images are viewed.

In addition to inter-picture predictive coding that makes use of correlations between pictures along the chronological axis, the left-view stream and the right-view stream are also compressed using inter-picture predictive coding that makes use of correlations between the different perspectives. The pictures of the right-view video stream are compressed by referencing pictures from the left-view video stream with the same display time.

For example, the leading P-picture of the right-view stream references an I-picture from the left-view stream, the B-pictures of the right-view stream reference Br-pictures from the left-view stream, and the second P-picture of the right-view stream references a P-picture from the left-view stream.

Further, a compression coded stream that can be decoded independently is termed a "base view stream". This may be either one of the left-view and right-view videos. All of the picture data from the left-view and right view streams making up the base view stream are compression coded according to inter-frame correlations. A stream that can only be decoded after the base view stream has been decoded is termed a "dependent view stream". Here, the base view stream and the dependent view stream may be stored and transferred as separate streams, or else may be multiplexed into a single stream, such as an MPEG2-TS stream or the like.

1.2 Overview of the Content Distribution System 1

Figure 5:
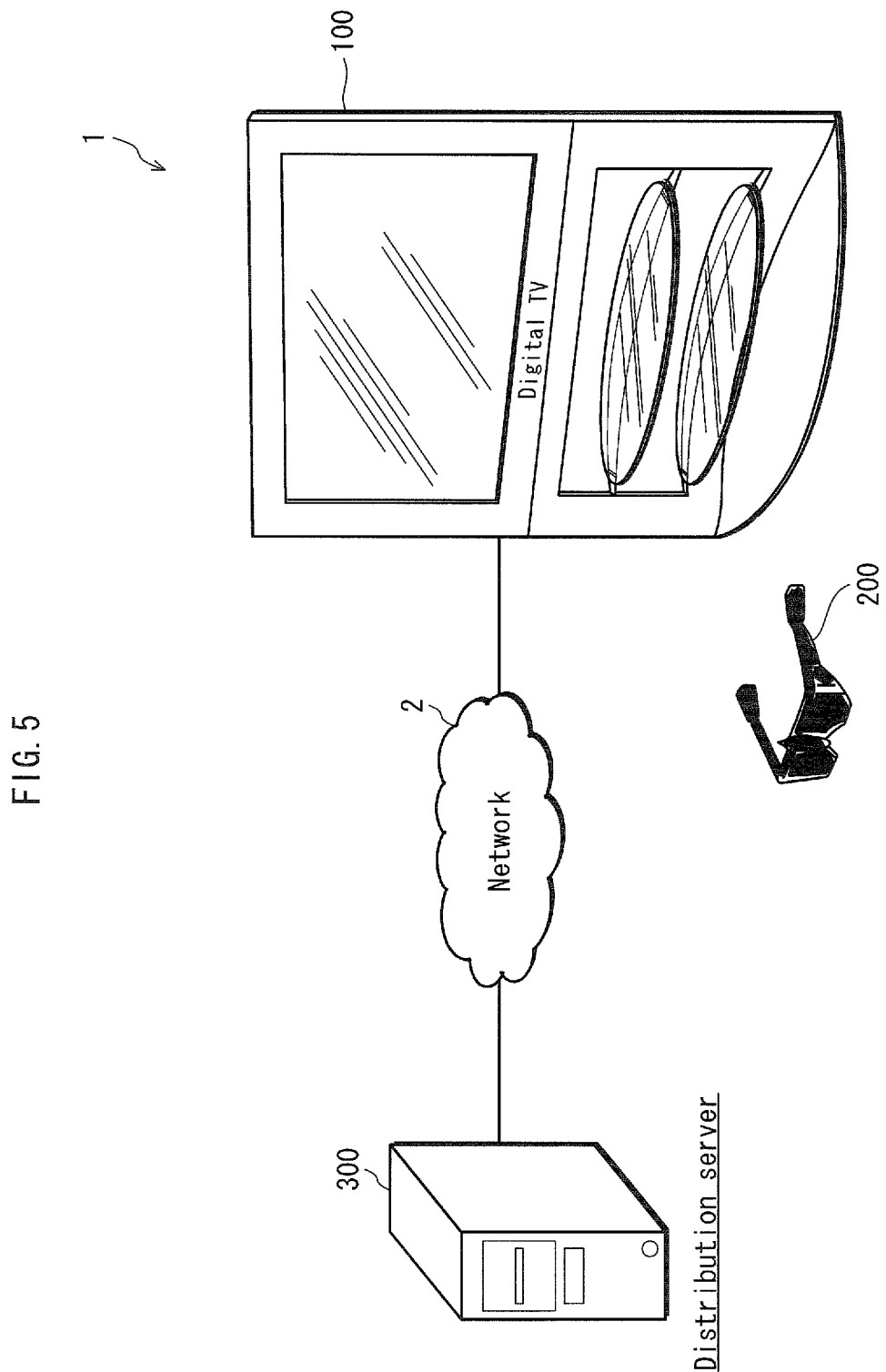
FIG. 5 illustrates a structure of a content distribution system 1.

A content distribution system 1 includes the digital television 100 and a distribution server 300 as illustrated in FIG. 5.

In the content distribution system 1, the digital television 100 and the distribution server 300 are connected to each other via a network 2 such as the internet, and perform transmission and reception of data such as program content with each other via the network 2. Note that program content is referred to hereinafter simply as "content".

In addition, the digital television 100 is, for instance, a plasma television, and a user is required to use the 3D glasses 200 when viewing content including 3D video on the digital television 100.

The distribution server 300 stores multiple pieces of content, each in a form of a stream specified under MPEG-4 AVC/H.264 (referred to hereinafter simply as a "stream"). When receiving a request for content from the digital television 100, the distribution server 300 transmits a playback control file corresponding to the content requested to the digital television 100. A playback control file is a file including description of information such as attribute information, a storage location (URL) and the like of the corresponding content. The information included in a playback control file is required for playback of the corresponding content. In addition to such information, a playback control file includes information identifying whether the corresponding content is (i) content constituted of only 2D video, (ii) content constituted of only 3D video, or (iii) content including both 2D and 3D video.

After having transmitted the playback control file, the distribution server 300 distributes, in response to a request by the digital television 100, a stream corresponding to the content requested to the digital television 100 via the network 2.

The digital television 100 transmits a request for content to the distribution server 300 via the network 2. Following this, when receiving the stream corresponding to the content from the distribution server 300, the digital television 100 plays back the received stream. Note that the content requested by the digital television 100 is content that is desired by a viewer and that has been selected by the viewer performing user operations.

Although the stream as discussed herein is a conventional stream specified under MPEG-4 AVC/H.264, a brief explanation thereof is provided in the following.

A stream is composed of a series of GOPs (Groups of Pictures). A GOP includes a plurality of frames (pictures) arranged in order in accordance with the reference relationship between the frames. When decoding the stream, the encoded frames are rearranged in the order in which they are to be displayed and decoding is performed in such an order.

In addition, each frame is provided with additional information referred to as a "Frame packing arrangement SEI (Supplemental Enhance Information)". The SEI includes identification information identifying whether a corresponding frame is a 3D video frame or a 2D video frame. Here, it should be noted that SEIs need not be provided to all frames, and when a frame is not provided with the SEI, an interpretation is made that the frame is a 2D video frame. Additionally, when a playback control file corresponding to content includes indication that the content is constituted of only 2D video or that the content is constituted of only 3D video, the SEI need not be provided to any of the frames constituting the content.

When receiving a stream including both 2D and 3D video frames after making a determination that content includes both 2D video and 3D video according to the information included in a playback control file, the digital television 100, in decoding a frame of the stream, makes a determination of whether the frame is a 3D video frame or a 2D video frame according to the identification information included in the corresponding SEI. The digital television 100 performs decoding and playback of a stream according to the result of the determination.

In contrast, when determining that the stream requested by a user is either a stream constituted of only 2D video or a stream constituted of only 3D video according to description included in the playback control file, the digital television 100 performs decoding and playback of the stream without referring to the identification information included in the SEIs.

In the following, detailed explanation is provided of each of the devices (the digital television 100 and the distribution server 300).

1.3 Structure of the Distribution Server 300

Figure 6:
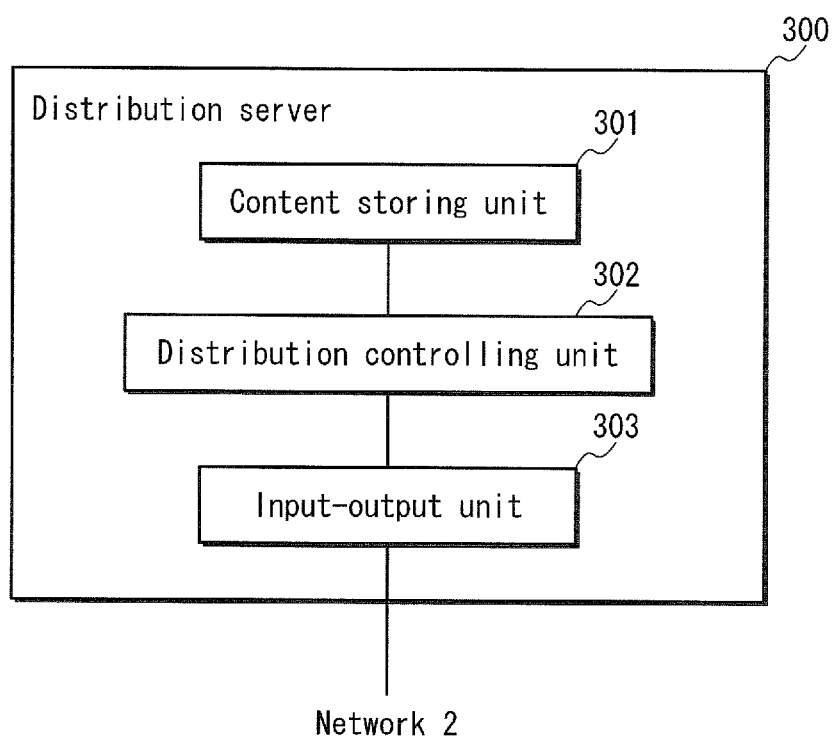
FIG. 6 illustrates a structure of a distribution server 300.

The distribution server 300 includes: a content storing unit 301; a distribution controlling unit 302; and an input/output unit 303 as illustrated in FIG. 6.

(1) The Content Storing Unit 301

Figure 7:
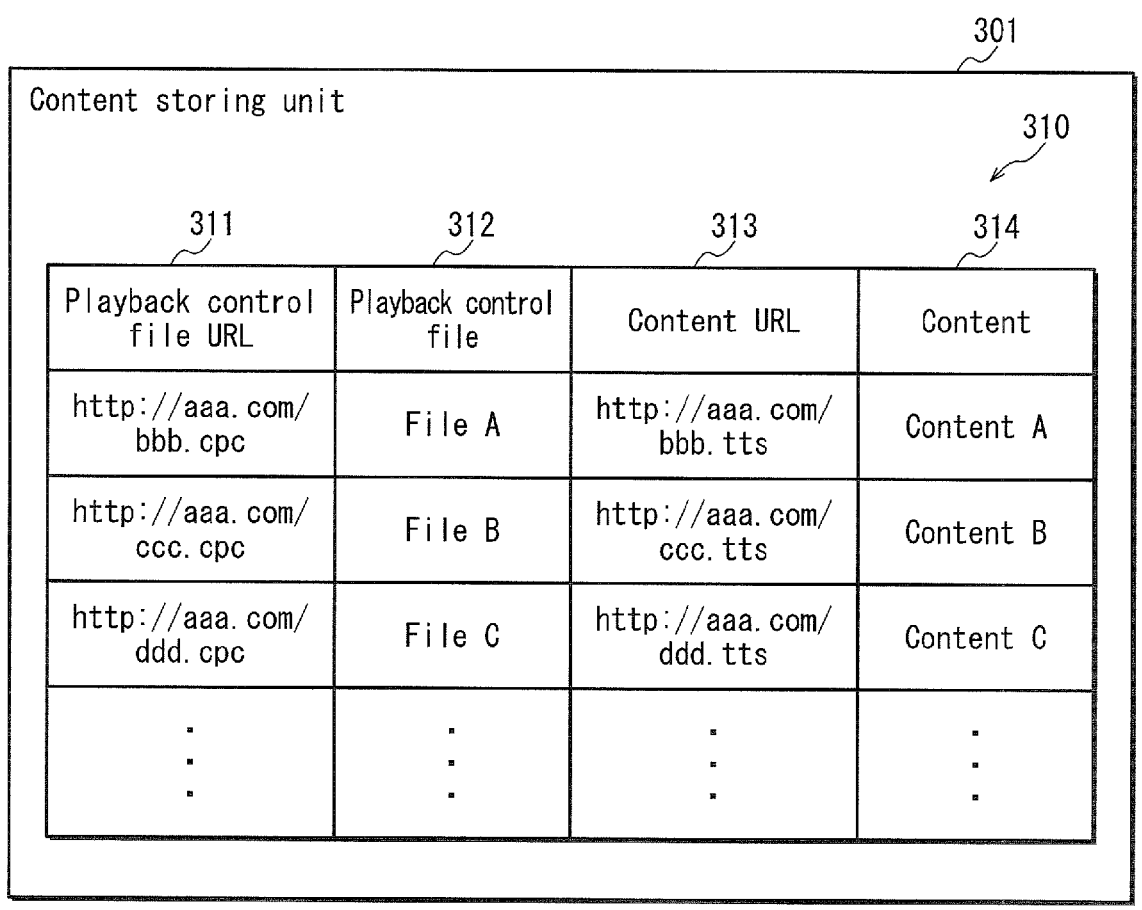
FIG. 7 illustrates one example of a data structure of a content management table 310.

The content storing unit 301 stores a content management table 310 as illustrated in FIG. 7.

The content management table 310 is provided with multiple areas, each of which storing a set of items. The items constituting a set include: a playback control file URL 311, a playback control file 312, a content URL 313, and content 314.

The item content 314 indicates content which can be specified by external units at a location indicated by a corresponding content URL 313. In addition, it is presumed herein that the content indicated under the item content 314 is stored in the form of a stream.

The item playback control file 312 indicates a playback control file that corresponds to content indicated under the item content 314 in the same set. A playback control file indicated under the item playback control file 312 can be specified by external units at a location indicated by a corresponding playback control file URL 311.

For instance, a content URL of content A is "http://aaa.com/bbb.tts", and a playback control file corresponding to the content A is indicated by "File A", which has a playback control file URL of "http://aaa.com/bbb.cpc".

In the following, explanation is provided of the playback control file.

Figure 8:
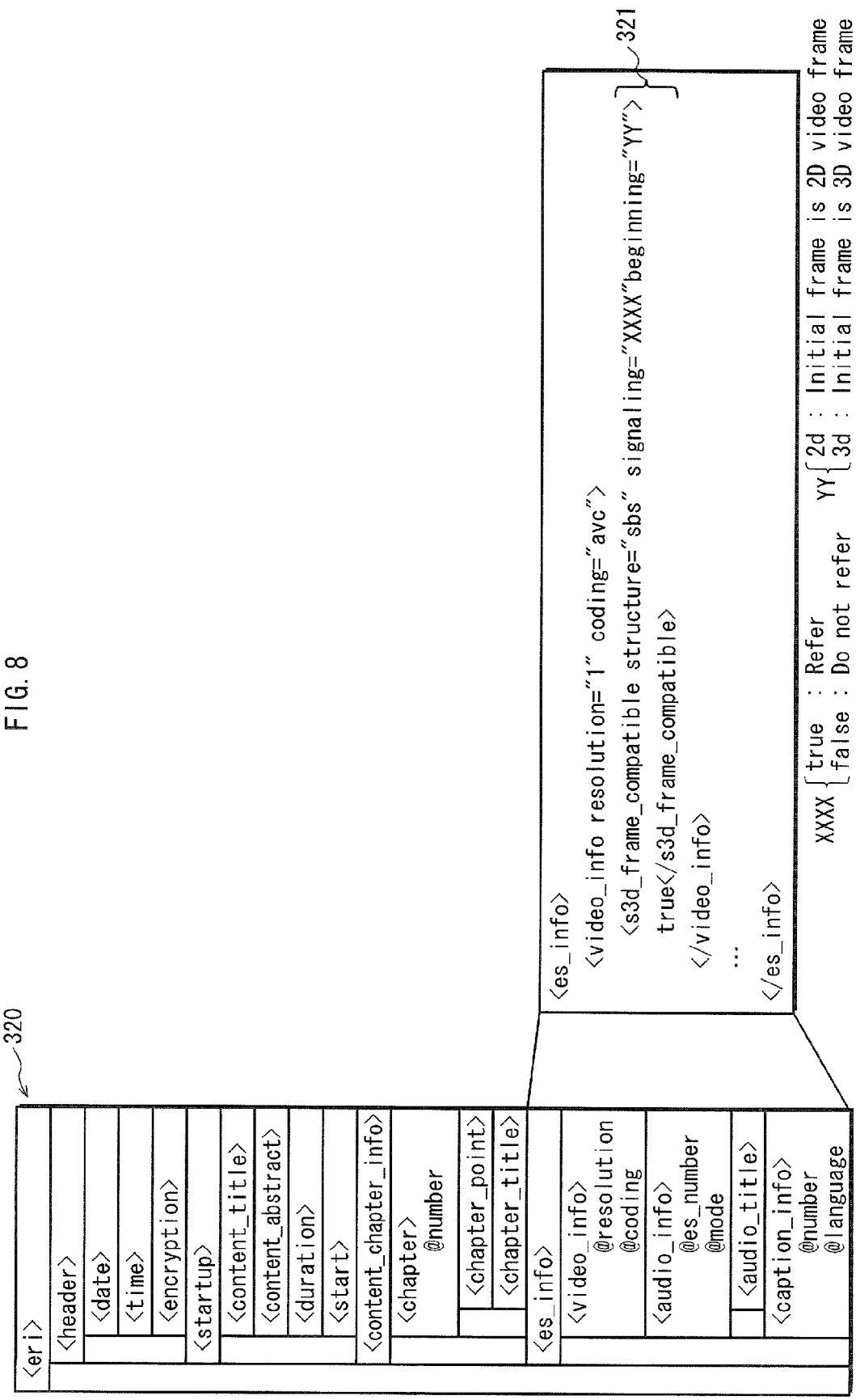
FIG. 8 illustrates one example of a data structure of a playback control file.

A playback control file 320 has a data structure as illustrated in FIG. 8.

A header portion (<header>) of the playback control file 320 stores information such as: <date> and <time> indicating the date and time that the playback control file 320 was created; and <encryption> indicating whether or not content corresponding to the playback control file 320 is encrypted.

A resource information portion (<startup>) of the playback control file 320 stores information such as: <content_title> indicating a title of the content; <content_abstract> providing a general description on the content; <duration> indicating a duration of the content; and (<start>) indicating a reference destination of the content. In specific, the reference destination indicated in <start> corresponds to a content URL of the content.

A chapter information portion (<content_chapter_info>) of the playback control file 320 stores information such as: <chapter> indicating a chapter number; <chapter_point> indicating a starting point of a chapter corresponding to the chapter number; and <chapter_title> indicating a title of the corresponding chapter. Here, it is to be noted that there may be multiple sets of chapter information constituted of a chapter number, a chapter starting point, and a chapter title.

An ES (Elementary Stream) information portion (<es_info>) of the playback control file 320 stores information such as: <video_info> including information pertaining to a video ES; <audio_info> including information pertaining to an audio ES; and <caption_info> including information pertaining to a subtitle ES.

In the present embodiment, a new description element 321 is additionally provided to the information pertaining to a video ES included in the ES information portion.

In specific, description of "s3d_frame_compatible structure="sbs"" included in the description element 321 indicates that a stream corresponding to the playback control file includes a frame generated in the Side-by-Side format. In other words, the description of "s3d_frame_compatible structure="sbs"" indicates that the stream includes 3D video. Here, when the stream includes a frame generated in the Top-and-Bottom format, the description of "sbs" in "s3d_frame_compatible structure="sbs"" is replaced with description of "tab". Note that, in the following description, the description "structure="sbs"" included in the description element 321 is referred to as a "3D composition state flag". Further, in the explanation to be provided in the following, when "the 3D composition state flag indicates Side-by-Side", "sbs" is set to the 3D composition state flag, whereas when "the 3D composition state flag indicates Top-and-Bottom", "tab" is set to the 3D composition state flag.

Description of "signaling="xxxx"" included in the description element 321 indicates whether or not identification information included in a corresponding SEI is to be referred to for decoding each frame of the stream. More specifically, either "true" or "false" is set to "xxxx" of "signaling="xxxx"" as illustrated in FIG. 8. When "true" is set to "xxxx", indication is being made that identification information included in a corresponding SEI is to be referred to for decoding each frame, whereas, when "false" is set to "xxxx", indication is being made that identification information included in the SEIs is not to be referred to. In other words, when "false" is set to "xxxx", indication is being made that all frames contained in the stream are 3D video frames. Note that, in the explanation provided in the following, the description "signaling="xxxx"" included in the description element 321 is referred to as a "program state flag". Further, in the explanation to be provided in the following, when "the program state flag indicates that identification information in SEI is to be referred to", the program state flag indicates "signaling="true"", whereas when "the program state flag indicates that identification information in SEI is not to be referred to", the program state flag indicates "signaling="false"".

Description of "beginning=" yy"" included in the description element 321 indicates whether an initial frame of the stream is a 2D video frame or a 3D video frame. Here, a description of either "2d" or "3d" is set to "yy" of "beginning="yy"" as illustrated in FIG. 8. When "2d" is set to "yy", indication is being made that the initial frame is a 2D video frame, whereas, when "3d" is set to "yy", indication is being made that the initial frame is a 3D video frame. Note that, in the following description, the description "beginning="yy"" included in the description element 321 is referred to as an "initial frame state flag". Further, in the explanation to be provided in the following, when "the initial frame state flag indicates 3D", the initial frame state flag indicates "beginning="3d"", whereas, when "the initial frame state flag indicates 2D", the initial frame state flag indicates "beginning="2d"". In addition, an initial frame as defined in the present embodiment refers to a frame, in a stream pertaining to a program, corresponding to a head portion of the program.

In addition, the description of "true" in "true</s3d_frame_compatible" included in the description element 321 indicates that the stream includes a 3D video frame.

In addition, the non-existence of the description element 321 in the ES information portion and/or the description of "false" being included instead of "true" in "true</s3d_frame_compatible" indicates that all frames constituting the stream are 2D video frames.

(2) The Distribution Control Unit 302

The distribution controlling unit 302 transmits a playback control file and distributes a stream to the digital television 100 in response to requests made by the digital television 100.

More specifically, when receiving file request information including a playback control file URL of a playback control file corresponding to distribution-target content (a distribution-target stream) from the digital television 100, the distribution controlling unit 302 obtains the playback control file identified by the playback control file URL included in the file request information received from the content management table 310.

Subsequently, the distribution controlling unit 302 transmits the playback control file so obtained to the digital television 100 via the input/output unit 303.

Further, when receiving information from the digital television 100 requesting for the distribution-target stream and stream request information including a content URL specifying the distribution-target stream, the distribution controlling unit 302 obtains the stream identified by the content URL included in the stream request information from the content management table 310. Subsequently, the distribution controlling unit 302 transmits the stream so obtained to the digital television 100 via the input/output unit 303.

(3) The Input/output Unit 303

The input/output unit 303 receives information (file request information and stream request information) from the digital television 100 via the network 2 and outputs the information so received to the distribution controlling unit 302.

In addition, the input/output unit 303 receives a playback control file and a stream from the distribution controlling unit 302 and transmits the playback control file and the stream to the digital television 100 via the network 2.

1.4 Structure of the Digital Television 100

The digital television 100 is, in specific, a plasma television and receives streams from the distribution server 300 via the network 2 and plays back the streams so received.

Figure 9:
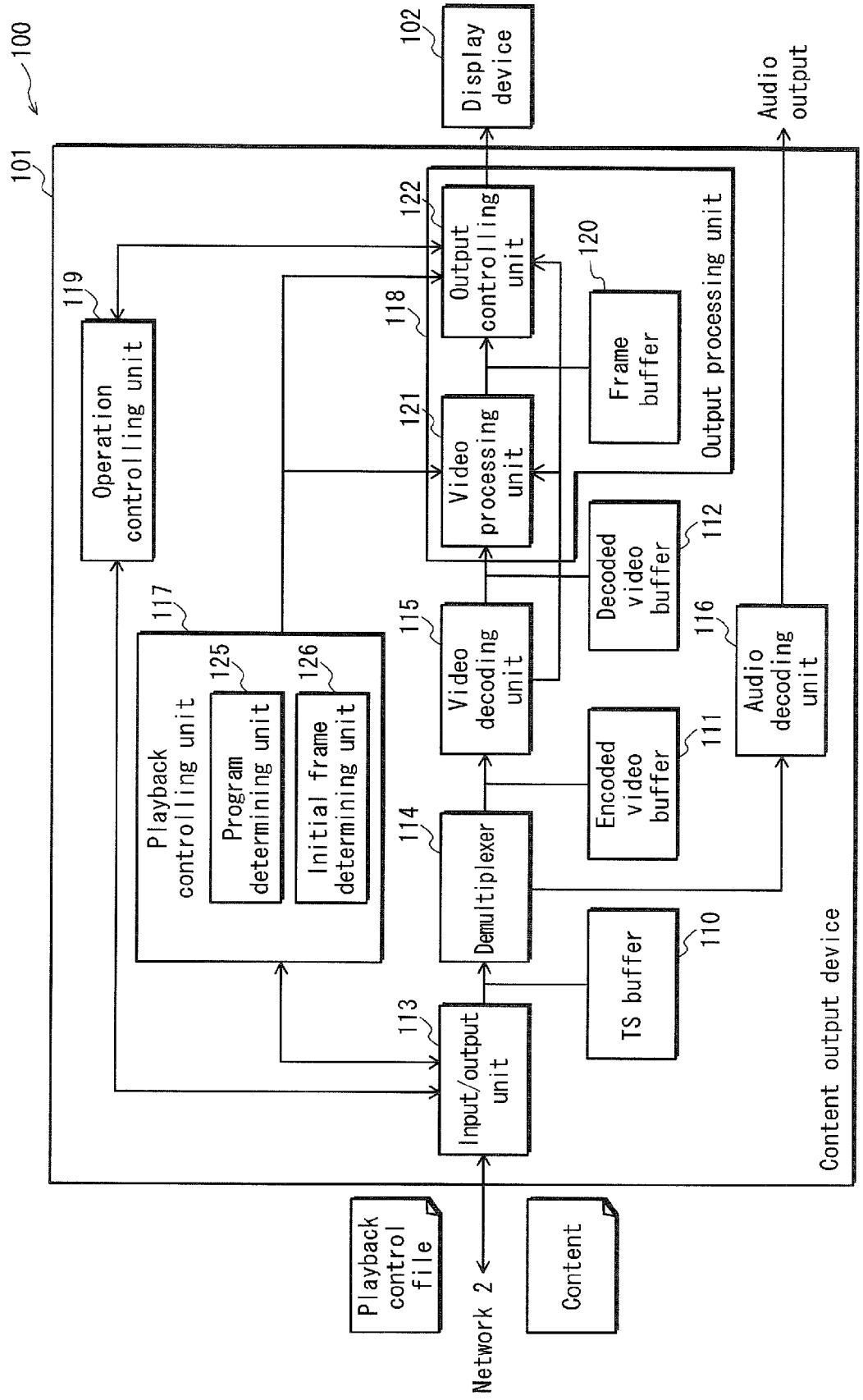
FIG. 9 illustrates a structure of the digital television 100.

The digital television 100 includes a content output device 101 and a display device 102 as illustrated in FIG. 9.

The content output device 101 decodes streams received from the distribution server 300, and outputs the decoded streams either in an output mode for 2D video (2D output mode) or an output mode for 3D video (3D output mode). More specifically, the content output device 101 switches the output mode to be applied to a stream to the 2D output mode when a stream received from the distribution server 300 is constituted of 2D video and switches the output mode to the 3D output mode when the stream received from the distribution server 300 is constituted of 3D video. Here, it is to be noted that video is output at an output cycle of 60 Hz when the output mode is the 2D output mode, whereas video is output in an output cycle of 120 Hz when the output mode is the 3D output mode. Further, a "3D video playback control (3D output mode)" as termed herein refers to outputting video at an output cycle of 120 Hz, whereas a "2D video playback control (2D output mode) as termed herein refers to outputting video at an output cycle of 60 Hz.

The display device 102 displays video output from the content output device 101.

In the following, explanation is provided of the structure of the content output device 101.

The content output device 101 includes: a TS buffer 110; an encoded video buffer 111; a decoded video buffer 112; an input/output unit 113; a demultiplexer 114; a video decoding unit 115; an audio decoding unit 116; a playback controlling unit 117; an output processing unit 118; and an operation controlling unit 119.

(1) The Operation Control Unit 119

The operation controlling unit 119 specifies a playback control file URL identifying content whose distribution has been requested. The specification of the playback control file URL is performed according to user operations made by a user (viewer).

Subsequently, the operation controlling unit 119 generates file request information including the specified playback control file URL, and transmits the file request information so generated to the distribution server 300 via the input/output unit 113.

The specification of the playback control file URL by the operation controlling unit 119 is performed as described in the following.

The operation controlling unit 119, when making a request for content with respect to the distribution server 300, receives playback control file URLs and names of content pieces (streams) managed by the distribution server 300 from the distribution server 300. When receiving the playback control file URLs and the names of the streams, the operation controlling unit 119 causes the display device 102 to display a list of the names of the streams. When a user operation is performed by the user of selecting a name of a given stream among the names of streams displayed in the list, the operation controlling unit 119 specifies a playback control file URL corresponding to the name of the content selected by the user.

(2) The Input/output Unit 113

The input/output unit 113 receives file request information from the operation controlling unit 119 and transmits the file request information so received to the distribution server 300 via the network 2.

The input/output unit 113 receives a playback control file from the distribution server 300 and outputs the playback control file so received to the playback controlling unit 117.

In addition, the input/output unit 113 receives a stream from the distribution server 300 and stores the stream so received to the TS buffer 110.

(3) The Playback Control Unit 117

The playback controlling unit 117 includes a program determining unit 125 and an initial frame determining unit 126 as illustrated in FIG. 9.

(3-1) The Program Determining Unit 125

The program determining unit 125 determines whether or not the description element 321 as illustrated in FIG. 8 is included in the playback control file. That is, the program determining unit 125 determines, by using the playback control file, whether a distribution-target stream is constituted of only 2D video or otherwise, includes 3D video.

When determining that the stream is constituted of only 2D video, the program determining unit 125 outputs a first reference instruction and a 2D output instruction to the output processing unit 118. The first reference instruction indicates that the identification information in the SEIs is not to be referred to, and the 2D output instruction indicates that the output mode to be applied to the stream is the 2D output mode.

Contrariwise, when determining that the description element 321 is included in the playback control file, or in other words, that a distribution-target stream includes 3D video, the program determining unit 125 determines whether or not the program state flag indicates that the identification information included in the SEIs is to be referred to.

When determining that the program state flag indicates that the identification information included in the SEIs is to be referred to, the program determining unit 125 outputs composition information and a second reference instruction to the output processing unit 118. The composition information is in accordance with description in the 3D composition state flag of the description element 321, and indicates whether 3D video is generated in the Side-by-Side format or the Top-and-Bottom format. The second reference instruction indicates that the identification information in the SEIs is to be referred to.

When determining that the program state flag indicates that the identification information included in the SEIs is not to be referred to, the program determining unit 125 outputs the first reference instruction, the composition information, and a 3D output instruction to the output processing unit 118. The 3D output instruction indicates that the output mode to be applied to the stream is the 3D output mode.

(3-2) The Initial Frame Determining Unit 126

The initial frame determining unit 126 performs the operations as described in the following when the program determining unit 125 determines that (i) the playback control file includes the description element 321 and (ii) the program state flag indicates that the identification information included in the SEIs is to be referred to.

The initial frame determining unit 126 determines whether the initial frame state flag indicates 3D or 2D.

When determining that the initial frame state flag indicates 2D, the initial frame determining unit 126 outputs the 2D output instruction to the output processing unit 118. Contrariwise, when determining that the initial frame state flag indicates 3D, the initial frame determining unit 126 outputs the 3D output instruction to the output processing unit 118.

(4) The TS Buffer 110

The TS buffer 110 is a buffer having a storage area for storing a stream distributed from the distribution server 300.

(5) The Demultiplexer 114

The demultiplexer 114 demultiplexes a received stream into a video stream constituting the video portion of the stream and an audio stream constituting the audio portion of the stream. Further, the demultiplexer 114 outputs the video stream so obtained to the encoded video buffer 111 and outputs the audio stream so obtained to the audio decoding unit 116.

(6) The Encoded Video Buffer 111

The encoded video buffer 111 is a buffer having a storage area for storing a video stream. A video stream stored in the encoded video buffer 111 is constituted of encoded frames, or in other words, frames that have not yet been decoded.

(7) The Video Decoding Unit 115

The video decoding unit 115 reads out a video stream constituting 2D and/or 3D video from the encoded video buffer 111, decodes the video stream read out to obtain video frames, and obtains SEIs provided to the video frames so obtained. Note that here, the video decoding unit does not cut out left-view images and right-view images from decoded 3D video frames upon decoding the 3D video frames.

Further, the video decoding unit 115 stores the decoded video frames to the decoded video buffer 112 and outputs the SEIs obtained to the output processing unit 118.

(8) The Decoded Video Buffer 112

The decoded video buffer 112 is a buffer having a storage area for storing decoded video frames.

(9) The Output Processing Unit 118

The output processing unit 118 switches the output mode to be applied to a decoded video frame according to whether the decoded video frame is a 2D video frame or a 3D video frame and outputs the decoded video frame to the display device 102.

The output processing unit 118 includes a frame buffer 120, a video processing unit 121, and an output controlling unit 122 as illustrated in FIG. 9.

(9-1) The Frame Buffer 120

Figure 10:
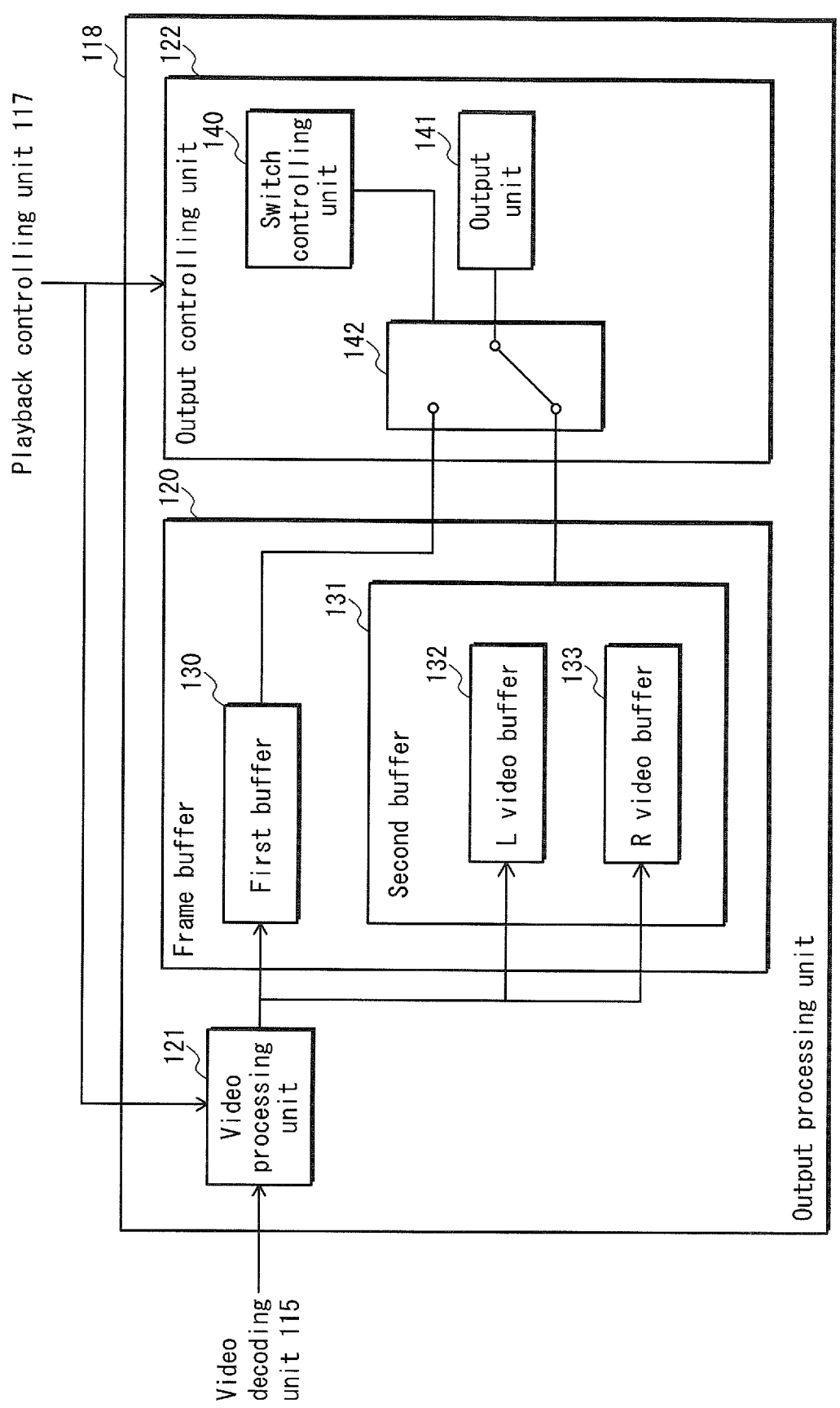
FIG. 10 illustrates a structure of an output processing unit 118.

The frame buffer 120 includes a first buffer 130 and a second buffer 131 as illustrated in FIG. 10.

The first buffer 130 is a buffer for storing video frames constituting 2D video (referred to as "2D video frames").

The second buffer 131 includes an L video buffer 132 and an R video buffer 133, and is a buffer for storing 3D video frames. More specifically, the L video buffer 132 stores left-view video frames (referred to hereinafter as "L video frames") and the R video buffer 133 stores right-view video frames (referred to hereinafter as "R video frames").

(9-2) The Video Processing Unit 121

The video processing unit 121 performs processing of video frames to be output while referring to the identification information included in the SEIs and video frames to be output while not referring to the identification information included in the SEIs according to instructions provided from the playback controlling unit 117.

(When Referring to Identification Information Included in the SEIs)

The video processing unit 121 receives the second reference instruction and the composition information from the program determining unit 125 of the playback controlling unit 117.

The video processing unit 121 reads out a processing-target video frame from the decoded video buffer 112. When identification information included in the SEI corresponding to the video frame does not exist or when the identification information indicates that the video frame is a 2D video frame, the video processing unit 121 writes the video frame read out to the first buffer 130 and outputs the 2D output instruction indicating that the output mode to be applied to the video frame is the 2D output mode to the output controlling unit 122.

Contrariwise, when reading out a processing-target video frame from the decoded video buffer 112 and further, when the identification information included in the SEI corresponding to the video frame indicates that the video frame is a 3D video frame, the video processing unit 121 generates an L video frame and an R video frame from the video frame read out, and writes the L video frame to the L video buffer 132 and writes the R video frame to the R video buffer 133. In this case, the video processing unit 121 outputs the 3D output instruction indicating that the output mode to be applied to the video frame is the 3D output mode to the output controlling unit 122. In specific, when the video frame is generated in the Side-by-Side format, the video processing unit 121 divides the video frame into left and right sides, and enlarges each of the sides in the horizontal direction so as to obtain the L video frame and the R video frame. Similarly, when the video stream is generated in the Top-and-Bottom format, the video processing unit 121 divides the video frame into top and bottom halves, and enlarges each of the halves in the vertical direction so as to obtain the L video frame and the R video frame.

(When Not Referring to Identification Information Included in the SEIs)

When only receiving the first reference instruction, the video processing unit 121 determines that the stream to be output is constituted of only 2D video. In such a case, the video processing unit 121 reads out a processing-target video frame from the decoded video buffer 112, and writes the video frame read out to the first buffer 130 without referring to the identification information in the SEI corresponding to the video frame.

Contrariwise, when receiving both the first reference instruction and the composition information, the video processing unit 121 determines that the stream to be output is constituted of only 3D video. In such a case, the video processing unit 121 reads out a processing-target video frame from the decoded video buffer 112, and generates an L video frame and an R video frame from the video frame read out according to the composition information. Here, the identification information included in the SEI of the video frame is not referred to. Further, the video processing unit 121 writes the L video frame so generated to the L video buffer 132, and writes the R video frame so generated to the R video buffer 133. Here, explanation concerning the manner in which an L video frame and an R video frame are generated according to the composition information is omitted, since explanation thereof has been already provided in the above.

(9-3) The Output Controlling Unit 122

The output controlling unit 122 includes a switch controlling unit 140, an output unit 141, and a switch 142 as illustrated in FIG. 10.

(The Switch 142)

The switch 142 switches the buffer connected to the output unit 141 between the first buffer 130 and the second buffer 131.

(The Switch Controlling Unit 140)

The switch controlling unit 140 controls the switch 142 and thereby switches the buffer connected to the output unit 141. In specific, the switch controlling unit 140 controls the switch 142 such that the output unit 141 is connected to the first buffer 130 when receiving the 2D output instruction from the playback controlling unit 117 and the video processing unit 121. Contrariwise, the switch controlling unit 140 controls the switch 142 such that the output unit 141 is connected to the second buffer 131 when receiving the 3D output instruction from the playback controlling unit 117 and the video processing unit 121.

(The Output Unit 141)

The output unit 141 switches the output cycle at which the video is output according to instructions provided from the playback controlling unit 117 and the video processing unit 121 and outputs the video to the display device 102. In specific, the output unit 141 sets the output cycle to 60 Hz when the 2D output instruction has been provided from the playback controlling unit 117 and the video processing unit 121. Further, the output unit 141 reads out 2D images which are to be output from the first buffer 130 connected therewith via the switch 142, and outputs the 2D images to the display device 102. Contrariwise, the output unit 141 sets the output cycle to 120 Hz when the 3D output instruction has been provided from the playback controlling unit 117 and the video processing unit 121. Further, the output unit 141 reads out 3D images which are to be output from the L video buffer 132 and the R video buffer 133 in alternation, and outputs the 3D images so read out to the display device 102. As already explained in the above, the L video buffer 132 and the R video buffer 133 are included in the second buffer 131 connected with the output unit 141 via the switch 142. Here, explanation is provided under the presumption that, in an initial state (at a point where a playback control file is received), the output cycle is set to 60 Hz.

In addition, the output unit 141 does not perform the switching between output cycles when the output mode specified by the instructions provided from the playback controlling unit 117 and the video processing unit 121 is the same as the output mode applied immediately before the reception of the instructions. For instance, when the 2D output instruction is received in a case where the present output mode is the 2D output mode, or that is, the output cycle of 60 Hz, the output unit 141 does not perform the switching between output cycles. Similarly, when the 3D output instruction is received in a case where the present output mode is the 3D output mode, or that is, the output cycle of 120 Hz, the output unit 141 does not perform the switching between output cycles.

As described in the above, the output unit 141 changes the output mode to the 3D output mode (i.e. output cycle of 120 Hz) when receiving the 3D output instruction from the playback controlling unit 117. At this point where the output unit 141 changes the output mode to the 3D output mode following the reception of the 3D output instruction, the decoding of the stream has not yet been executed. That is, the output unit 141, when the initial frame of the stream is a 3D video frame, changes the output mode to the 3D mode before the decoding of the stream is started and waits for the video processing unit 121 to perform the above-mentioned processing. In other words, the output unit 141 enters an output standby state. As such, the output unit 141 prepares for output of a given frame by setting the output mode to be applied to the frame to either the 2D output mode or the 3D output mode according to the instruction provided from the playback controlling unit 117.

(10) Audio Decoding Unit 116

The audio decoding unit 116 receives an audio stream from the demultiplexer 114, decodes the audio stream so received to generate audio, and outputs the audio so generated.

1.5 Operation (1) Overview of Operations of the Content Distribution System 1

Figure 11:
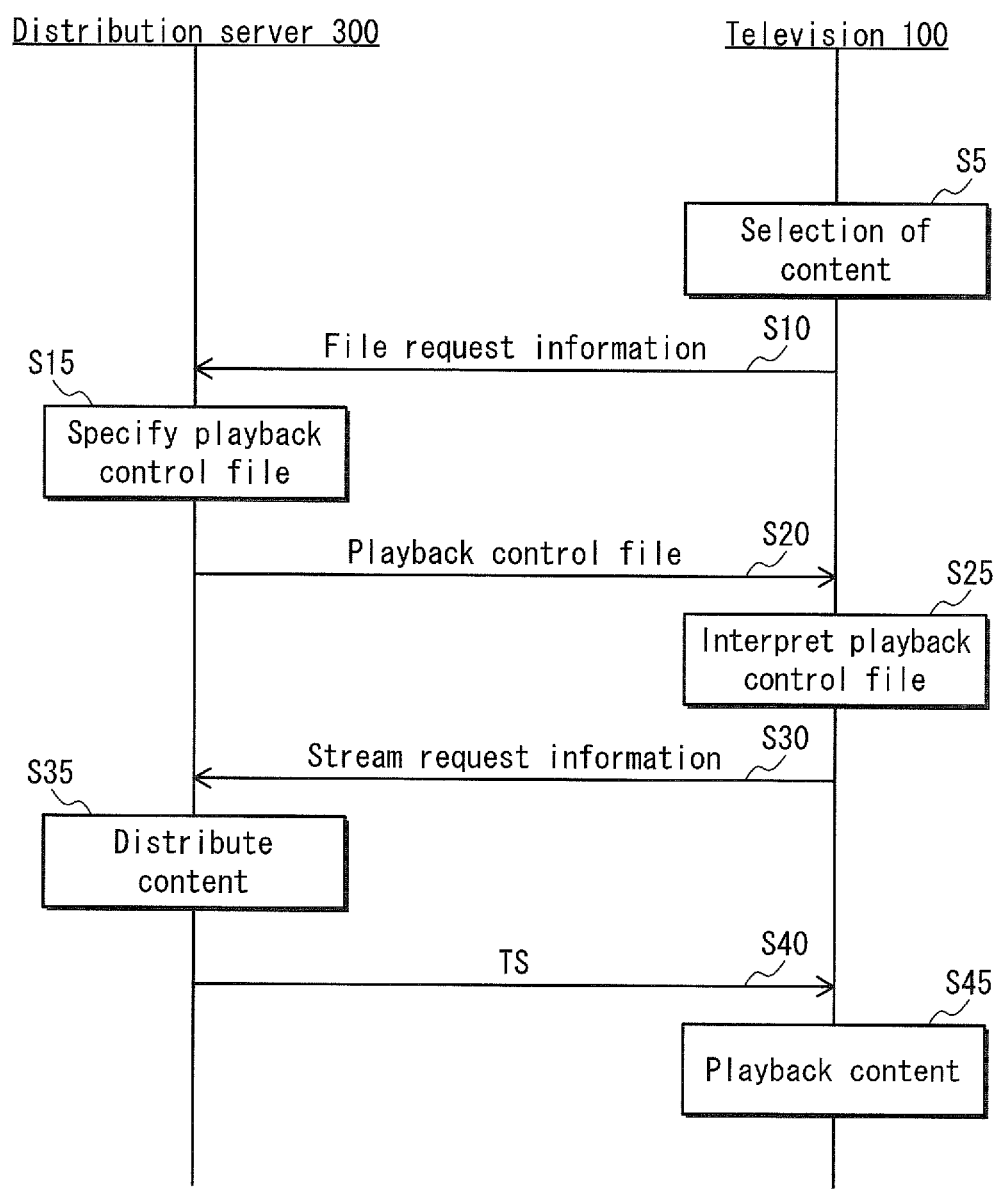
FIG. 11 illustrates an overview of operations of the content distribution system 1.

In the following, an overview is provided of the operations of the content distribution system 1 with reference to the flow of processing illustrated in FIG. 11.

When a selection of content (a stream) whose distribution is requested is made as a result of user operations performed by a user (Step S5), the digital television 100 transmits file request information including a playback control file URL specifying a playback control file corresponding to the selected content to the distribution server 300 (Step S10).

The distribution server 300 specifies the playback control file corresponding to the playback control file URL received from the digital television 100 (Step S15) and transmits the playback control file so specified to the digital television 100 (Step S20).

Upon receiving the playback control file, the digital television 100 interprets the content of the playback control file (Step S25). Subsequently, the digital television 100 transmits stream request information to the distribution server 300 (Step S30).

Upon receiving the stream request information, the distribution server 300 distributes content (a stream, or more specifically, a TS) whose distribution has been requested to the digital television 100 (Steps S35, S40).

The digital television 100 receives the stream from the distribution server 300, decodes the stream, and plays back the stream employing an appropriate output mode (Step S45). The output mode is either the 2D output mode for 2D video or the 3D output mode for 3D video.

(2) Playback Operations of the Digital Television 100

In the following, explanation is provided of the operations of the digital television 100 when playing back a stream, or more particularly, of the detailed operations in Steps S25 and S45 illustrated in FIG. 11, with reference to the flowchart in FIG. 12.

The program determining unit 125 determines whether or not the description element as illustrated in FIG. 8 is included in the playback control file, or that is, whether or not the stream distributed includes 3D video (Step S100).

When the program determining unit 125 determines that the stream distributed does not include 3D video, or in other words, that the stream distributed includes only 2D video ("No" in Step S100), the output processing unit 118 plays back each of the video frames contained in the stream in the 2D output mode without referring to the identification information included in the SEIs for decoding each of the frames (Step S105).

When the program determining unit 125 determines that the stream distributed includes 3D video ("Yes" in Step S100), the program determining unit 125 determines whether the program state flag included in the playback control file indicates that the identification information included in the SEIs is to be referred to or that the identification information included in the SEIs is not to be referred to (Step S110).

When the program determining unit 125 determines that the identification information included in the SEIs is not to be referred to, or that is, when determining that "false" is set to "signaling" ("No" in Step S110), the output processing unit 118 plays back each of the video frames included in the stream in the 3D output mode without referring to the identification information included in the SEIs (Step S115).

Contrariwise, when the program determining unit 125 determines that the playback control file indicates that the identification information included in the SEIs is to be referred to, or that is, when determining that "true" is set to "signaling" ("Yes" in Step S110), the initial frame determining unit 126 determines whether the initial frame state flag indicates 2D or 3D (Step S120).

When the initial frame determining unit 126 determines that the initial frame state flag indicates 3D, or that is, when determining that "3d" is set to "beginning" ("Yes" in Step S120), the output processing unit 118 switches the output mode to the 3D output mode (Step S125). More specifically, the switch controlling unit 140 controls the switch 142 so that the switch 142 is connected to the second buffer 131, and the output unit 141 changes the output cycle to 120 Hz.

When Step S125 has been executed or when the initial frame determining unit 126 determines that the initial frame state flag indicates 2D (or that is, when determining that "2d" is set to "beginning") ("No" in Step S120), the output processing unit 118 performs playback processing for video including both 2D and 3D video (Step S130).

(3) Playback Operations in the 2D Output Mode

In the following, explanation is provided of operations involved in playback processing in the 2D output mode performed in Step S105 illustrated in FIG. 12, with reference to the flowchart in FIG. 13.

In the following explanation, presumption is made that, upon the commencement of playback processing in the 2D output mode, the video processing unit 121 has received only the first reference instruction from the playback controlling unit 117 according to the result of the determination made in Step S100 illustrated in FIG. 12. In other words, it is presumed that, at this point, the video processing unit 121 has already made a determination that the stream to be output is constituted of only 2D video. In addition, it is also presumed that, at this point, the output controlling unit 122 has already received the 2D output instruction from the playback controlling unit 117 according to the result of the determination made in Step S100 illustrated in FIG. 12.

The video decoding unit 115 decodes the video stream stored in the encoded video buffer 111 and writes the video frame obtained to the decoded video buffer 112 (Step S200).

Subsequently, the video processing unit 121 reads out a processing-target video frame, i.e. a 2D video frame, from the decoded video buffer 112, and writes the 2D video frame to the first buffer 130 without referring to the identification information included in the SEI of the 2D video frame (Step 205).

The output unit 141 sets the output cycle to 60 Hz, reads out the 2D image to be output from the first buffer 130 connected to the switch 142, and outputs the 2D image so obtained to the display device 102 (Step S210).

The video decoding unit 115 determines whether or not there exists video to be subsequently decoded (Step S215). When determining that video to be subsequently decoded exists ("Yes" in Step S215), the video decoding unit 115 executes the processing in Step S200. Contrariwise, when determining that video to be subsequently decoded does not exist ("No" in Step S215), processing is terminated.

Figure 14:
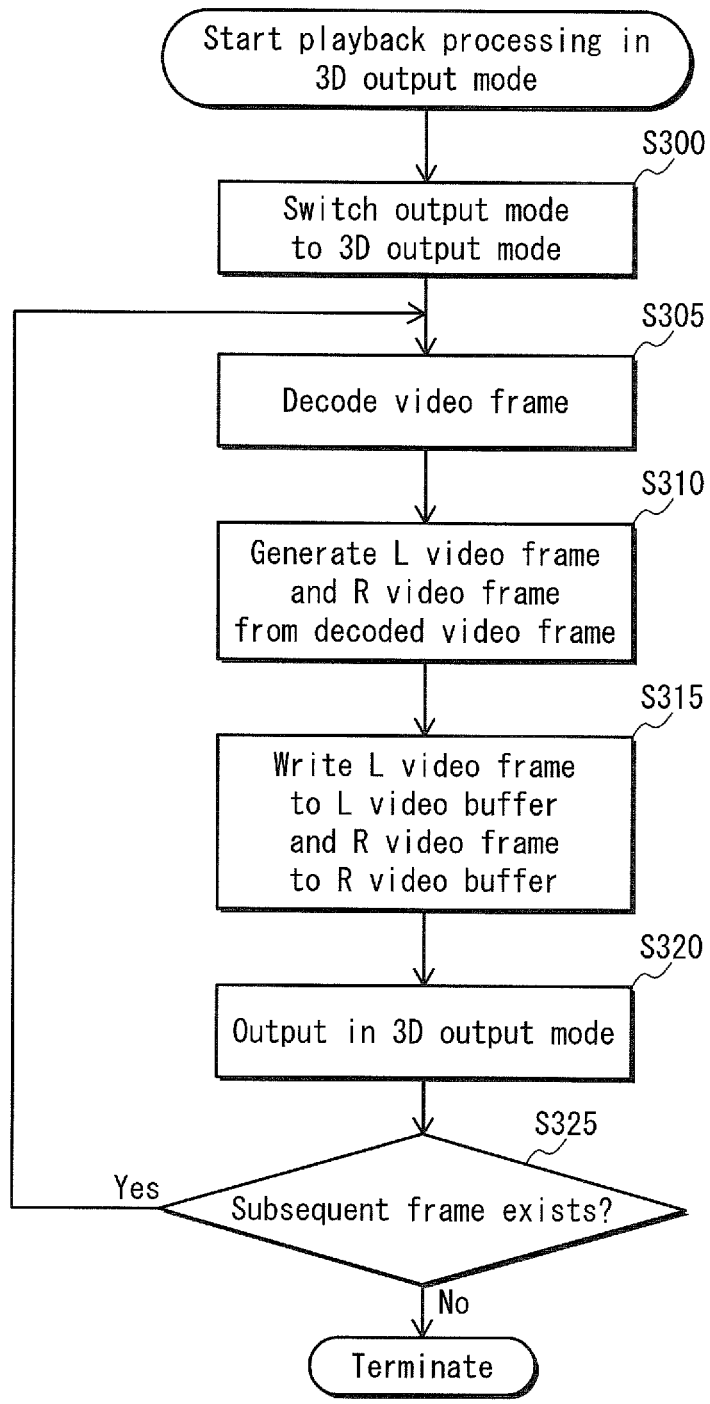
FIG. 14 is a flowchart illustrating playback processing in a 3D output mode.

(4) Playback Operations in the 3D Output Mode In the following, explanation is provided of operations involved in playback processing in the 3D output mode performed in Step S115 illustrated in FIG. 12, with reference to the flowchart in FIG. 14.

In the following explanation, a presumption is made that, upon the commencement of the playback processing for video including only 3D video, the video processing unit 121 has received both the first reference instruction and the composition information from the playback controlling unit 117 according to the result of the determination made in Steps S100 and S110 illustrated in FIG. 12. In other words, it is presumed that, at this point, the video processing unit 121 has already made a determination that the stream to be output is constituted of only 3D video.

When receiving the 3D output instruction from the playback controlling unit 117, the switch controlling unit 140 controls the switch 142 so that the switch 142 is connected to the second buffer 131 (Step S300). Further, the output unit 141 switches the output cycle to 120 Hz.

The video decoding unit 115 decodes the video stream stored in the encoded video buffer 111 and writes the video frame obtained to the decoded video buffer 112 (Step S305).

The video processing unit 121, when reading out a processing-target video frame from the decoded video buffer 112, generates an L video frame and an R video frame from the video frame according to the composition information (Step S310). Here, the identification information included in the SEI of the video frame is not referred to. The video processing unit 121 writes the L video frame so generated to the L video buffer 132 and writes the R video frame so generated to the R video buffer 133 (Step S315).

The output unit 141 sets the output cycle to 120 Hz, reads out images to be output from the L video buffer 132 and the R video buffer 133 in alternation, and outputs the images so read out to the display device 102 (Step S320). The L video buffer 132 and the R video buffer 133 are included in the second buffer 131 connected with the switch 142.

The video decoding unit 115 determines whether or not there exists video to be subsequently decoded (Step S325). When determining that video to be subsequently decoded exists ("Yes" in Step S325), the video decoding unit 115 executes the processing in Step S305. Contrariwise, when determining that video to be subsequently decoded does not exist ("No" in Step S325), processing is terminated.

(5) Playback Operations for Video Including Both 2D and 3D Video

Figure 15:
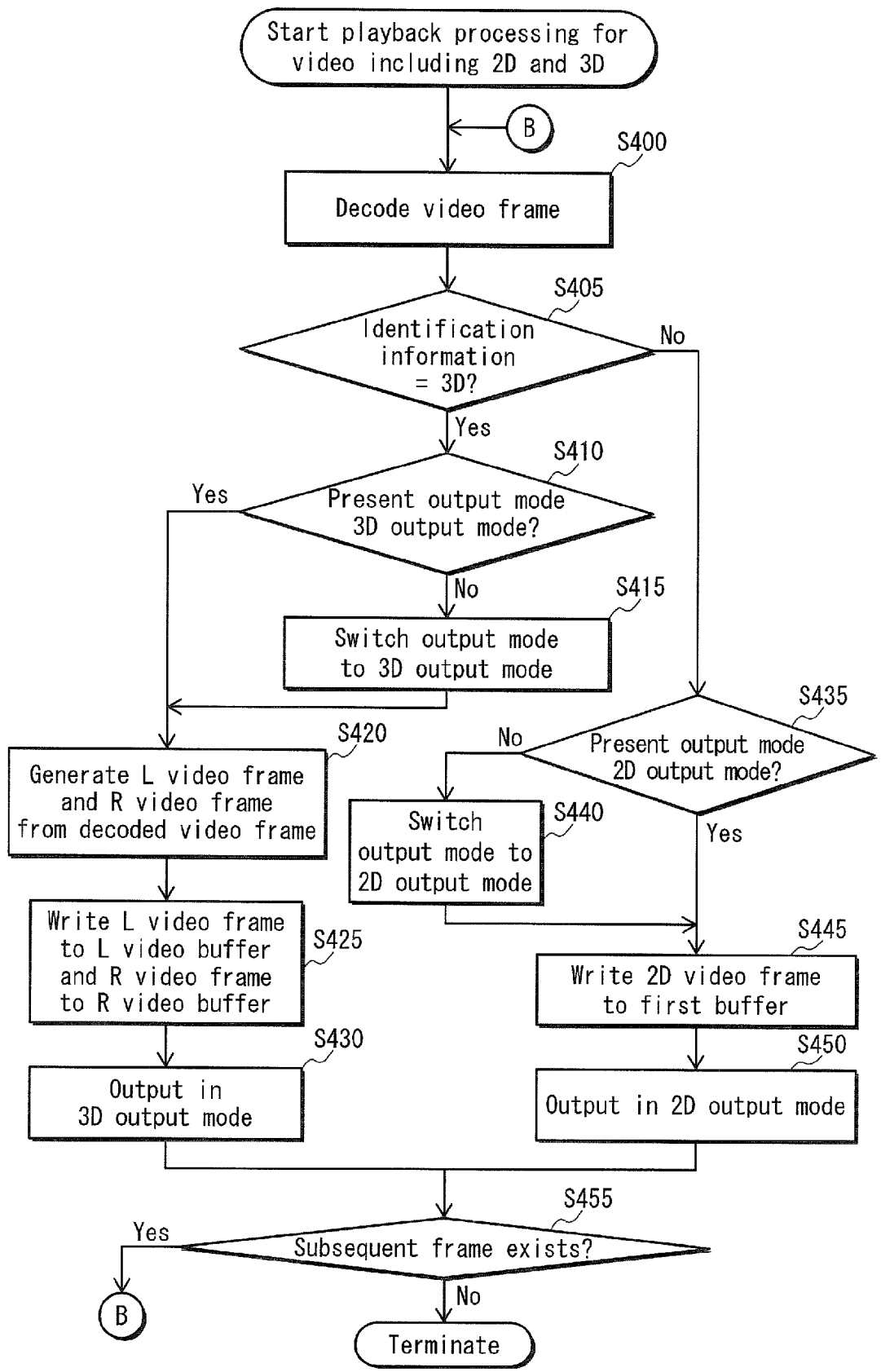
FIG. 15 is a flowchart illustrating operations involved in playback processing of video including both 2D and 3D video.

In the following, explanation is provided of playback processing for video including both 2D and 3D video performed in Step S130 illustrated in FIG. 12, with reference to the flowchart in FIG. 15.

In the following explanation, a presumption is made that, upon the commencement of the playback processing for video including both 2D and 3D video, the video processing unit 121 has received both the second reference instruction and the composition information from the playback controlling unit 117 according to the result of the determination made in Steps S100 and S110 illustrated in FIG. 12. In other words, it is presumed that, at this point, the video processing unit 121 has already made a determination that the stream to be output is constituted of both 2D and 3D video.

The video decoding unit 115 decodes the video stream stored in the encoded video buffer 111 and writes the video frame obtained to the decoded video buffer 112 (Step S400).

The video processing unit 121 determines whether or not the identification information included in the SEI of a processing-target video frame indicates that the video frame is a 3D video frame (Step S405).

When the video processing unit 121 determines that the identification information included in the SEI indicates that the video frame is a 3D video frame ("Yes" in Step S405), the output unit 141 of the output controlling unit 122 determines whether the present output mode, i.e. the output cycle, is the 3D output mode (Step S410). More specifically, when determining that the identification information included in the SEI indicates that the video frame is a 3D video frame, the video processing unit 121 outputs the 3D output instruction to the output controlling unit 122. When receiving the 3D output instruction from the video processing unit 121, the output controlling unit 122 determines whether a previous instruction having been provided thereto for a preceding video frame is the 3D output instruction or the 2D output instruction. As such, when the previous instruction provided thereto is the 3D output instruction, the output controlling unit 122 is able to determine that the present output mode (i.e. output cycle) is the 3D output mode. Contrariwise, when the previous instruction provided thereto is the 2D output instruction, the output controlling unit 122 is able to determine that the present output mode (i.e. output cycle) is the 2D output mode.

When determining that the present output mode is not the 3D output mode ("No" in Step S410), the output unit 141 switches the output mode to the 3D output mode, or in other words, switches the output cycle to 120 Hz (Step S415). Following this, processing proceeds to Step S420. Contrariwise, when determining that the present output mode is the 3D output mode ("Yes" in Step S410), the output unit 141 does not perform the switching between output modes, and processing proceeds to Step S420.

The video processing unit 121, when reading out a processing-target video frame from the decoded video buffer 112, generates an L video frame and an R video frame from the video frame according to the composition information (Step S420). The video processing unit 121 writes the L video frame so generated to the L video buffer 132 and writes the R video frame so generated to the R video buffer 133 (Step S425).

The output unit 141 sets the output cycle to 120 Hz, reads out images to be output from the L video buffer 132 and the R video buffer 133 in alternation, and outputs the images so read out to the display device 102 (Step S430). The L video buffer 132 and the R video buffer 133 are included in the second buffer 131 connected with the switch 142.

Contrariwise, when the video processing unit 121 determines that the identification information included in the SEI indicates that the video frame is not a 3D video frame, or in other words, that the video frame is a 2D video frame ("No" in Step S405), the output unit 141 determines whether the present output mode, i.e. the output cycle, is the 2D output mode (Step S435). More specifically, when determining that the identification information included in the SEI indicates that the video frame is a 2D video frame, the video processing unit 121 outputs the 2D output instruction to the output controlling unit 122. As already described in the above, the output controlling unit 122, when receiving the 2D output instruction from the video processing unit 121, determines whether the previous instruction provided thereto for a preceding video frame is the 3D output instruction or the 2D output instruction.

When determining that the present output mode is not the 2D output mode ("No" in Step S435), the output unit 141 switches the output mode to the 2D output mode, or in other words, switches the output cycle to 60 Hz (Step S440). Following this, processing proceeds to Step S445. Contrariwise, when determining that the present output mode is the 2D output mode ("Yes" in Step S435), the output unit 141 does not perform the switching between output modes, and processing proceeds to Step S445.

The video processing unit 121 reads out a processing-target video frame, i.e. a 2D video frame, from the decoded video buffer 112 and writes the 2D video frame to the first buffer 130 (Step 445).

The output unit 141 sets the output cycle to 60 Hz, reads out the 2D image to be output from the first buffer 130 connected to the switch 142, and outputs the 2D image so obtained to the display device 102 (Step S450).

The video decoding unit 115 determines whether or not there exists video to be subsequently decoded (Step S455). When determining that video to be subsequently decoded exists ("Yes" in Step S455), the video decoding unit 115 executes the processing in Step S400. Contrariwise, when determining that video to be subsequently decoded does not exist ("No" in Step S455), processing is terminated.

(6) Specific Example of Operations

In the following, explanation is provided of the operations involved in playback processing by referring to a diagram illustrating transition of processing between components.

(6-1) A Case where Identification Information Included in SEIs Is Referred to

In the following, explanation is provided of playback processing performed while referring to the identification information included in the SEIs, with reference to the flow of processing illustrated in FIG. 16. Here, it should be noted that the explanation in the following is provided under the presumption that the description element 321 exists in the playback control file, and in the description element 321, (i) the 3D composition state flag indicates the Side-by-Side format, (ii) the program state flag indicates that the identification information included in the SEIs is to be referred to, and (iii) the initial frame state flag indicates 2D.

The distribution server 300 transmits the playback control file to the digital television 100 (Step S500).

The playback controlling unit 117 determines whether the playback control file received includes the description element 321, and, when determining that the description element 321 exists, interprets description included in each of the state flags included in the description element 321 (Step S505). In this case, the playback controlling unit 117 makes an interpretation that (i) the stream to be distributed includes both 2D video and 3D video, (ii) the 3D video included in the stream is in the Side-by-Side format, and (iii) the initial frame of the stream is a 2D video frame.

The playback controlling unit 117 outputs composition information to the video processing unit 121 (Step S508). The composition information is in accordance with the result of the interpretation performed with respect to the 3D composition state flag, and in this case, indicates that the 3D video included in the stream has been generated in the Side-by-Side format.

Following this, the playback controlling unit 117 transmits stream request information to the distribution server 300 (Step S510).

In response, the distribution server 300 transmits the stream having been requested to the digital television 100 (Step S515).

The input/output unit 113 performs buffering by writing the stream so received to the TS buffer 110 (Step S520). The demultiplexer 114 demultiplexes the stream written to the TS buffer 110 into a video stream and an audio stream in this case (Step S525). Here, the video stream obtained as a result of the demultiplexing is written to the encoded video buffer 111.

The video decoding unit 115 decodes the video stream written in the encoded video buffer 111, and writes the video frames obtained to the decoded video buffer 112 (Step S530).

Subsequently, the video processing unit 121 determines whether a processing-target video frame is a 2D video frame or a 3D video frame by referring to the identification information included in the SEI of the video frame (Step S535). The video processing unit 121 outputs an instruction in accordance with the result of the determination to the output controlling unit 122 (Step S540). In specific, the video processing unit 121 outputs the 2D output instruction when determining that the video frame is a 2D video frame, and outputs the 3D output instruction when determining that the video frame is a 3D video frame.

The video processing unit 121 performs buffering with respect to the video frame according to the result of the determination in Step S535 (Step S545). In specific, the video processing unit 121 reads out the processing-target video frame from the decoded video buffer 112 and stores the video frame to the first buffer 130 when determining that the video frame is a 2D video frame. Contrariwise, when determining that the processing-target video frame is a 3D video frame, the video processing unit 121 reads out the video frame from the decoded video buffer 112, generates an L video frame and an R video frame from the video frame, and writes the L video frame to the L video buffer 132 and writes the R video frame to the R video buffer 133. Here, the generation of the L video frame and the R video frame is performed according to the composition information.

The output controlling unit 122 switches between output modes according to the instruction received from the video processing unit 121 (Step S550) and outputs images stored in the frame buffer 120 (Step S555).

(6-2) A Case where Identification Information Included in the SEIs Is Referred to and the Initial Frame State Flag Indicates 3D In the following, explanation is provided of playback processing performed when the identification information included in the SEIs is referred to and further, when the initial frame state flag indicates 3D. The explanation provided in the following focuses on points differing from the processing illustrated in FIG. 16.

Figure 16:
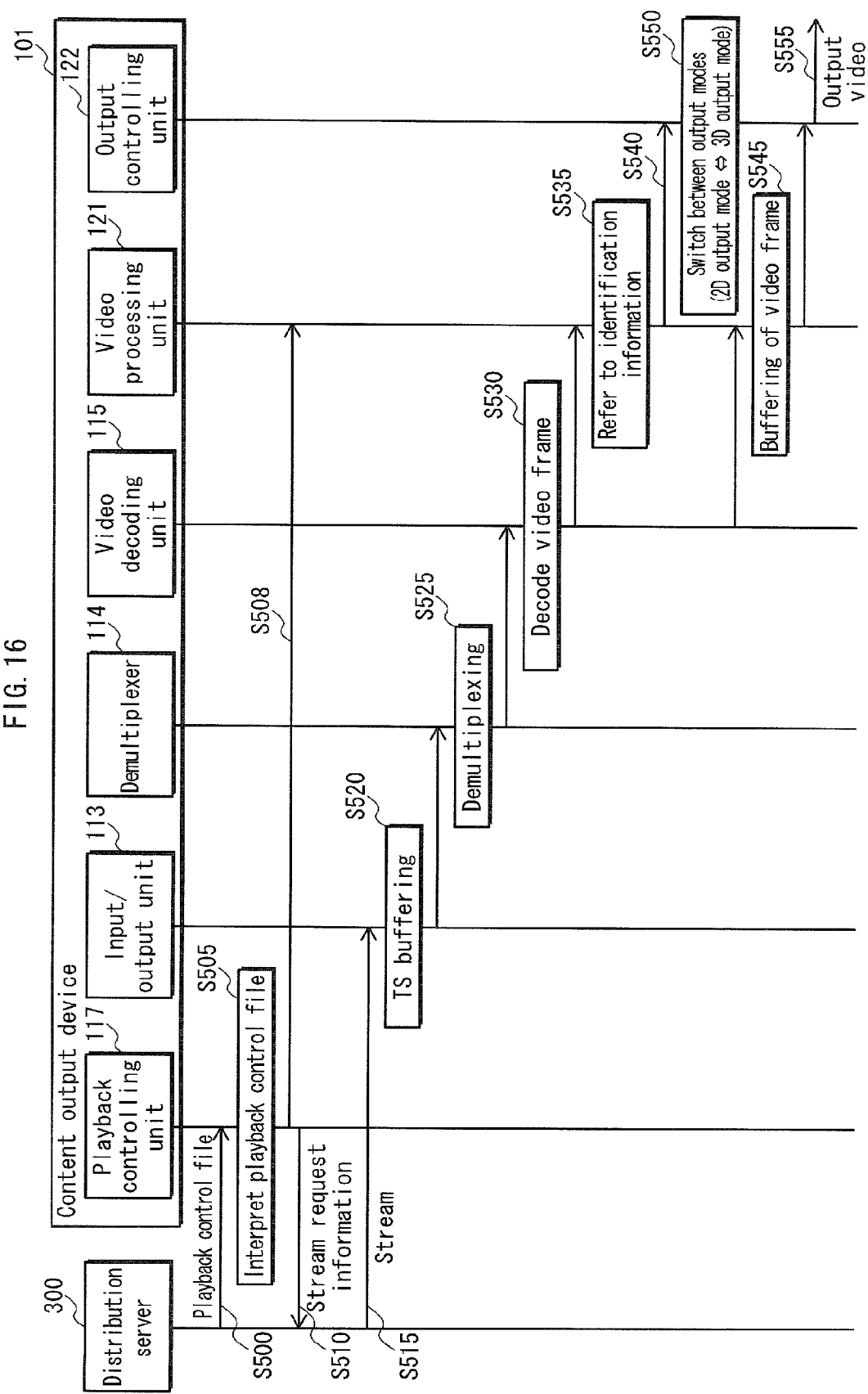
FIG. 16 illustrates operations involved when performing playback processing while referring to identification information contained in SEIs.

The processing in Steps S500-S508 illustrated in FIG. 16 is performed by the distribution server 300 and the playback controlling unit 117 of the content output device 101. Here, in the processing in Step S505, the playback controlling unit 117 makes an interpretation that (i) the stream to be distributed includes both 2D video and 3D video, (ii) the 3D video included in the stream is in the Side-by-Side format, and (iii) the initial frame is a 3D video frame.

Following this, and prior to the execution of the processing in Step S510 by the playback controlling unit 117, the playback controlling unit 117 and the output controlling unit 122 execute the processing described in the following.

The playback controlling unit 117 outputs the 3D output instruction to the output controlling unit 122. The 3D output instruction is output in accordance with the result of the interpretation performed with respect to the initial frame state flag.

The output controlling unit 122 sets the output mode to the 3D output mode. More specifically, the switch controlling unit 140 controls the switch 142 so that the switch 142 is connected to the second buffer 131, and the output unit 141 changes the output cycle to 120 Hz.

When such processing (output of the 3D output instruction and setting of the 3D output mode) has been performed, the processing corresponding to Step S510 and the following steps illustrated in FIG. 16 is executed.

Since explanation concerning the processing corresponding to Step S510 and the following steps has already been provided in the above, explanation thereof is omitted in the following.

According to the operations explained in the above, the output controlling unit 122 does not need to perform the switching between output modes in Step S550 even when a determination is made by the video processing unit 121 that the initial frame is a 3D video frame. This is since the output controlling unit 122 has already set the output mode to the 3D output mode prior to this point by receiving the 3D output instruction from the playback controlling unit 117.

Figure 17:
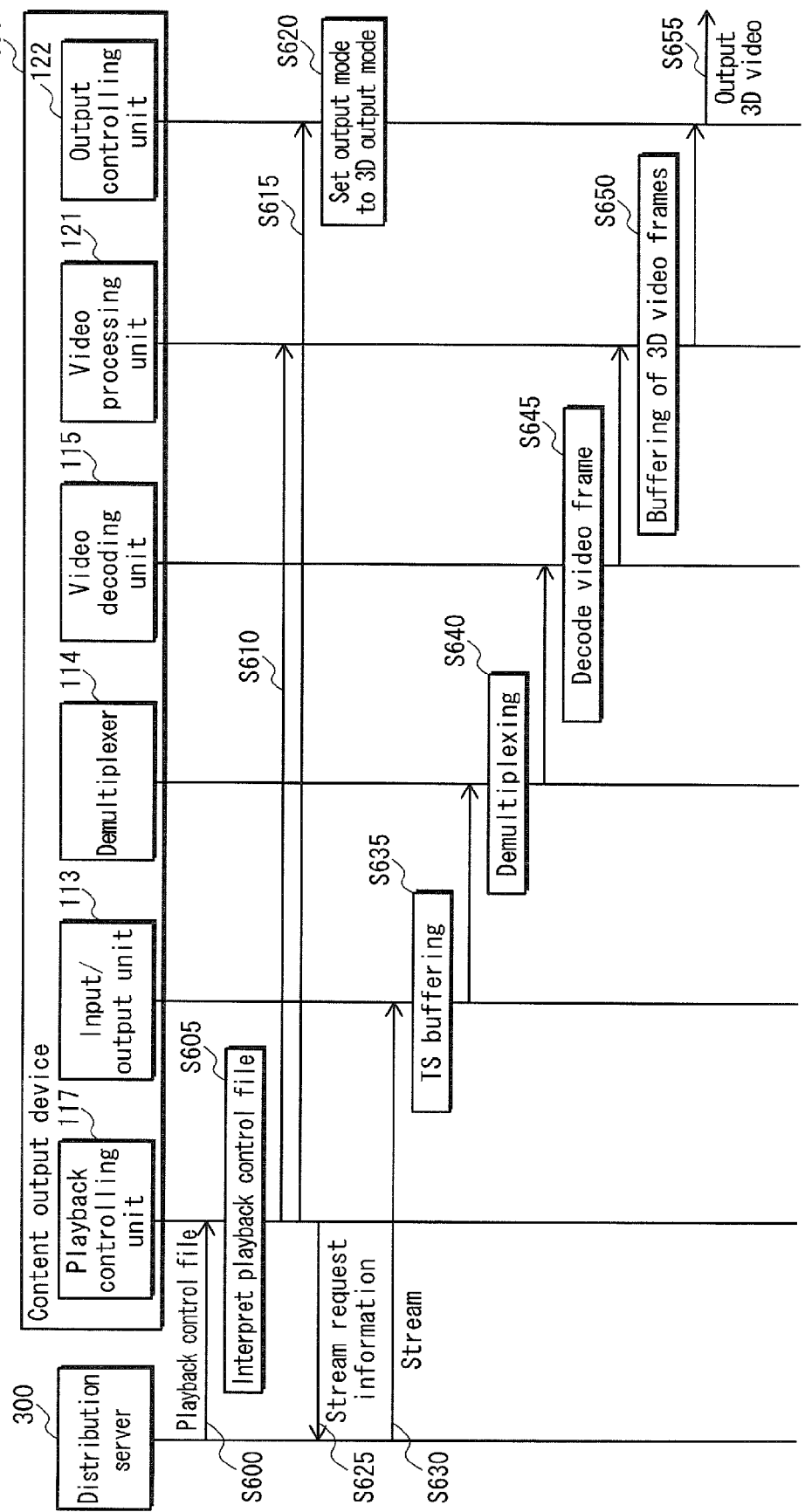
FIG. 17 illustrates operations involved when performing playback processing without referring to identification information contained in the SEIs.

(6-3) A Case where Identification Information Included in SEIs Is Not Referred to In the following, explanation is provided of playback processing performed while not referring to the identification information included in the SEIs, with reference to the flow of processing illustrated in FIG. 17. It should be noted that the explanation in the following is provided under the presumption that the description element 321 exists in the playback control file, and in the description element 321, (i) the 3D composition state flag indicates the Side-by-Side format; (ii) the program state flag indicates that the identification information included in the SEIs is not to be referred to; and (iii) the initial frame state flag indicates 3D.

The distribution server 300 transmits the playback control file to the digital television 100 (Step S600).

The playback controlling unit 117 determines whether the playback control file received includes the description element 321, and, when determining that the description element 321 exists, interprets description included in each of the state flags included in the description element 321 (Step S605). In this case, the playback controlling unit 117 makes an interpretation that (i) the stream to be distributed is constituted of only 3D video, (ii) the 3D video is in the Side-by-Side format, and (iii) the initial frame is a 3D video frame.

The playback controlling unit 117 outputs composition information to the video processing unit 121 (Step S610). The composition information is in accordance with the result of the interpretation performed with respect to the 3D composition state flag, and in this case, indicates that the 3D video included in the stream has been generated in the Side-by-Side format. Further, the playback controlling unit 117 outputs the 3D output instruction to the output controlling unit 122 (Step S615). The 3D output instruction is output in accordance with the result of the interpretation performed with respect to the initial frame state flag.

The output controlling unit 122 sets the output mode to the 3D output mode (Step S620). More specifically, the switch controlling unit 140 controls the switch 142 so that the switch 142 is connected to the second buffer 131, and changes the output cycle to 120 Hz.

Following this, the playback controlling unit 117 transmits stream request information to the distribution server 300 (Step S625).

In response, the distribution server 300 transmits the stream having been requested to the digital television 100 (Step S630).

The input/output unit 113 performs buffering by writing the stream so received to the TS buffer 110 (Step S635). The demultiplexer 114 demultiplexes the stream written to the TS buffer 110 into a video stream and an audio stream in this case (Step S640). Here, the video stream obtained as a result of the demultiplexing is written to the encoded video buffer 111.

The video decoding unit 115 decodes the video stream written in the encoded video buffer 111, and writes the video frames obtained to the decoded video buffer 112 (Step S645).

When reading out a processing-target video frame from the decoded video buffer 112, the video processing unit 121 generates an L video frame and an R video frame from the video frame, and writes the L video frame to the L video buffer 132 and writes the R video frame to the R video buffer 133 (Step S650). Here, the identification information included in the SEI of the video frame is not referred to, and the generation of the L video frame and the R video frame is performed according to the composition information.

The output controlling unit 122 outputs the video frame stored in the frame buffer 120 in the 3D output mode (Step S655).

1.6 Modifications

Although description has been provided in the above on the present invention with reference to a first embodiment thereof, the present invention is not limited to such an embodiment. Various modifications as described in the following are construed as being included in the scope of the present invention.

(1) In the new description element 321 provided to the playback control file described in the above-described embodiment, both the program state flag and the initial frame state flag are set. However, the present invention is not limited to this.

That is, only one of the program state flag and the initial frame state flag may be set to the description element 321.

FIGS. 18A and 18B illustrate description to be included in the description element 321 in such cases.

A description element 321a illustrated in FIG. 18A indicates description being provided in a case where specification is made of (i) the generation method of the 3D video frames and (ii) whether or not the identification information included in the SEIs is to be referred to.

Figure 12:
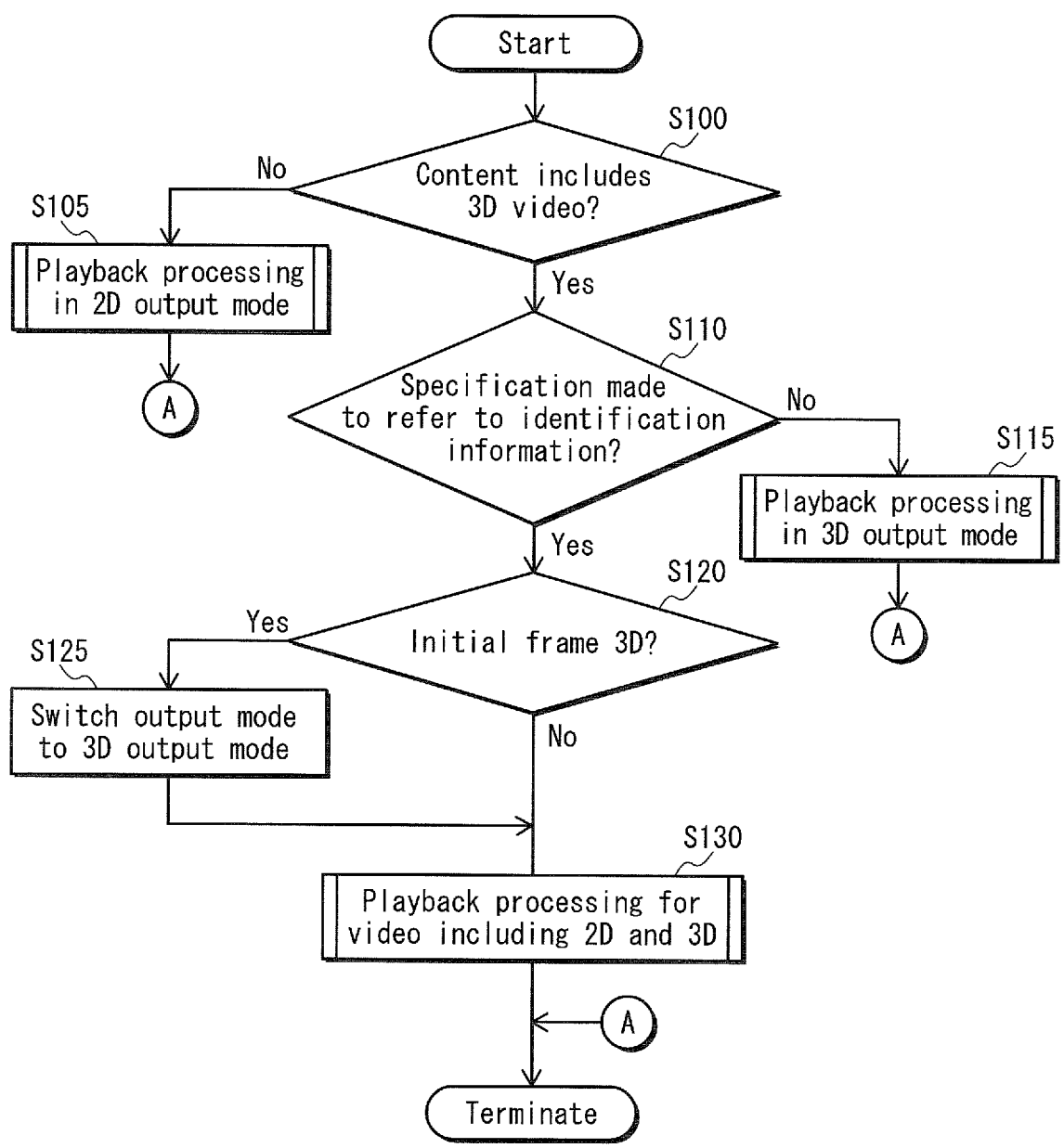
FIG. 12 is a flowchart illustrating operations of the digital television 100 when performing playback of a stream.
Figure 13:
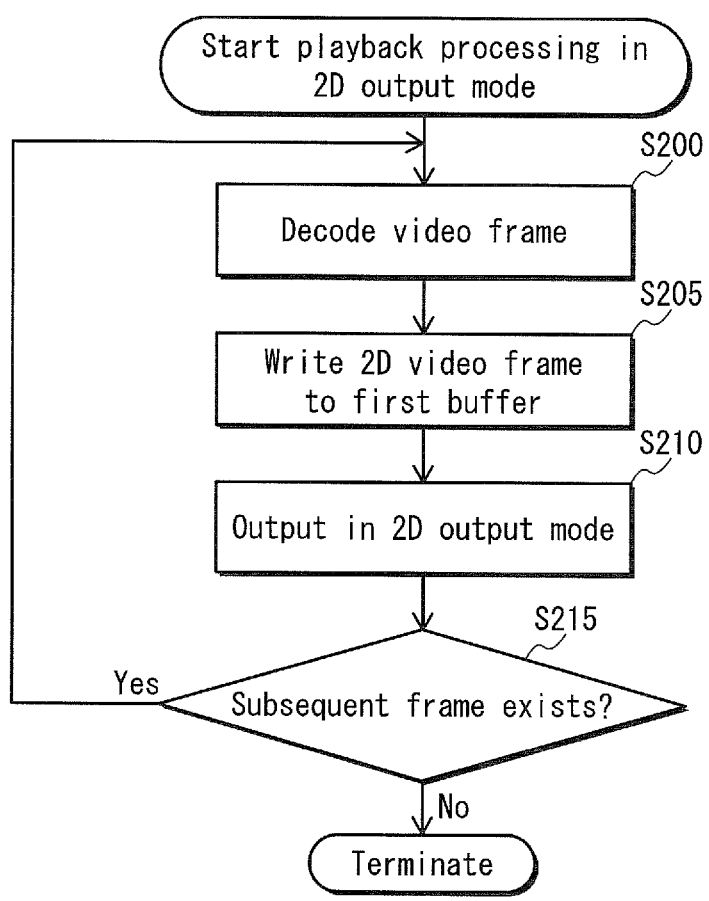
FIG. 13 is a flowchart illustrating playback processing in a 2D output mode.

The operations in this case may be realized by deleting Steps S120 and S125 illustrated in FIG. 12.

A description element 321b illustrated in FIG. 18B indicates description being provided in a case where specification is made of (i) the generation method of the 3D video frames and (ii) a video type of the initial frame.

The operations in this case may be realized by deleting Steps S110 and S115 illustrated in FIG. 12.

In addition, both the program state flag and the initial frame state flag are provided with respect to a stream corresponding to a single program in the above-described embodiment. However, the present invention is not limited to this.

When content contained in the stream is constituted of multiple chapters, the program state flag and the initial frame state flag may be set with respect to each of the chapters.

FIG. 18C illustrates an example of a description element 322 provided to the playback control file in such a case. For instance, when setting an initial frame state flag for each of the chapters constituting the content, an initial frame state flag may be additionally provided to the description of <chapter_point> indicating a starting point of a chapter.

In such a case, when receiving information from a user related to a chapter the user desires to view, such as a chapter number, the digital television 100 performs the processing illustrated in FIG. 12. Here, it is to be noted that, in this case, determination is made in Step S120 of whether an initial frame state flag that is included in "content_chapter_info" and that corresponds to the chapter whose information has been received indicates "2d" or "3d", rather than determining whether the initial frame state flag included in "es_info" indicates "2d" or "3d". The initial frame state flag included in the "es_info" and the initial frame state flag included in the "content_chapter_info" are respectively illustrated in FIG. 8 and FIG. 18C.

In addition, dynamic generation of the program state flag and the initial frame state flag may be performed in cases where playback is performed starting from a given position of the stream. Such cases include, for instance, a case where playback of a stream is resumed after being temporarily suspended.

Further, the description included in the playback control file may be as illustrated in FIG. 19.

(1-1) FIG. 19

FIG. 19 illustrates file description 330a indicating (i) whether a program related thereto is a single program including only 3D video at all portions thereof and (ii) whether an initial frame of the program is a 3D video frame or a 2D video frame.

Description 331a surrounded by broken lines includes description specifying that the program indicated by the file description 330a is a 3D program and also includes description concerning the details of the 3D program. In specific, the description 331a indicates: (i) that the frames are in the Side-by-Side format; (ii) whether an entirety of the program or only a part of the program is constituted of 3D video; and (iii) whether the head portion of the program is constituted of 3D video or 2D video.

Description 332a includes description indicating that the frames of the program are in the Side-by-Side format.

Description 333a includes description indicating (i) whether an entirety of the program or only a certain portion of the program is constituted of 3D video and (ii) whether the head portion of the program is constituted of 3D video or 2D video. For instance, description of "entire3d" included in the description 333a indicates that the entire program is constituted of 3D video. In such a case, the digital television 100 is able to perform playback processing in the 3D output mode (refer to FIG. 14) without having to refer to the identification information provided to the frames constituting the program.

Further, description of "partial3d_start3d" included in the description 333*a* indicates that (i) a certain portion of the program is constituted of 3D video and (ii) the head portion of the program is constituted of 3D video. In such a case, the digital television 100 is able to perform playback processing for video including both 2D and 3D video by switching the output mode to the 3D output mode in advance.

Further, description of "partial3d_start2d" included in the description 323*a* indicates that (i) a certain portion of the program is constituted of 3D video and (ii) the head portion of the program is constituted of 2D video. In such a case, the digital television 100 is able to perform playback processing for video including both 2D and 3D video by not changing the output mode from the initial state (2D output mode) upon commencement of playback processing.

(2) The 3D composition state flag, the program state flag, and the initial frame state flag are set to <video info> included in the playback control file in the above-described embodiment. However, the present invention is not limited to this.

That is, such state flags may be set to any location of the playback control file, provided that the interpretation of such state flags can be performed. Alternatively, such state flags may be provided in the form of independent files, or information similar to the state flags may be set to a header of a stream to be distributed.

(3) In the above-described embodiment, description has been provided presuming that the format of the streams distributed is a format specified under MPEG-4 AVC/H.264. However, the present invention is not limited to this.

The format of the streams to be distributed may be a format specified under MPEG-2 and other video compression-coding methods.

(4) In the above-described embodiment, description has been provided taking a digital television as an example of a playback apparatus receiving and playing back streams. However, the present invention is not limited to this, and the playback apparatus need not be a digital television.

The playback apparatus that receives and plays back streams may be a recorder, a set-top box, etc.

(5) In the above-described embodiment, the digital television 100 and the distribution server 300 are connected to each other via the internet. However, the present invention is not limited to this.

The digital television 100 and the distribution server 300, in combination, may be considered as a single device when presuming that connection therebetween is established via a leased line. Further, the distribution server 300 may be, for instance, a detachable device composed of a portable recording medium (an SD card, a DVD Disc, a Blu-ray Disc and the like) storing content in the form of streams.

(6) In the above-described embodiment, content is distributed in the form of streams via the internet. However, the present invention is not limited to this.

The content may be recorded on packaged media in the form of streams. Alternatively, the content may be content once having been broadcasted by using broadcast waves and then recorded with use of a recording device. In addition, the content may also be distributed in a downloadable form on the internet. The content may also be motion pictures produced with use of a video camera or the like. That is, the content may be distributed in any form, given that the content (stream) is stored in association with a file including information corresponding to the description element 321 as described in the above.

(7) In the above-described embodiment, description has been provided on switching between output cycles applied to 2D video and 3D video taking a plasma television as example. However, the present invention is not limited to this.

The technology of switching between output cycles as described in the above-described embodiment may be applied to any apparatus including a display device, provided that a certain amount of time is required for switching between displaying of 2D video and displaying of 3D video (that is, the switching is not completed within an interval corresponding to one video frame) due to a different panel driving method being applied for displaying each type of video.

(8) In the above-described embodiment, the frame buffers, namely the first buffer and the second buffer (the L image buffer and the R image buffer), are provided as different components in a physical sense. However, the present invention is not limited to this.

The first buffer, the L image buffer, and the R image buffer may be collectively embodied on one physical component, and switching between the buffers may be realized by utilizing time-sharing.

(9) In the above-described embodiment, the output cycle applied to 2D video is set to ⅙₀ seconds/cycle. However, the present invention is not limited to this.

2D video may be output at other cycles (for instance, ⅕₀ seconds/cycle). When making such an arrangement, 3D video is output at half the cycle at which 2D video is output (for instance, ⅟₁₀₀ seconds/cycle).

(10) In the above-described embodiment, description has been provided based on a frame compatible method such as the Side-by-Side format. However, the present invention is not limited to this.

For instance, the present invention may be applied to a service compatible method involving the use of an encoding method such as H.264/MVC.

In such a case, the determination of whether each of frames constituting content containing both 2D and 3D video is a 2D frame or a 3D frame is performed by (i) detecting whether or not a dependent view stream exists with use of a Subset sequence parameter set or the like, (ii) detecting whether or not an elementary stream containing a dependent view stream exists, or (iii) interpreting an MVC_extension_descriptor or a hierarchy_descriptor, both of which being included in the PMT and including description concerning existence/non-existence of a dependent view stream.

(11) In the above-described embodiment, description of information concerning content is included in the playback control file. However, the present invention is not limited to this.

For instance, description of similar information may be included as attribute information of an object element or an video element in an HTML document or a BML document.

(12) The method described in the above-described embodiment may be realized by storing a program including description of the procedures of the method to a memory and causing a CPU (Central Processing Unit) or the like to read out the program from the memory and execute the program.

Alternatively, a program including description of the procedures of the above-described method may be stored on a recording medium and may be distributed.

(13) The structures (functional blocks) pertaining to the above-described embodiment may be implemented as an LSI (Large Scale Integration), which is an integrated circuit. That is, each of the structures may be separately integrated into a single chip, or the structures may be integrated into a single chip including a part or all of the structures. Although description has been made on the basis of an LSI in the above, the name of the integrated circuit may differ according to the degree of integration of the chips. Other integrated circuits include an IC (Integrated Circuit), a system LSI, a super LSI, and an ultra LSI. Further, the method applied for forming integrated circuits is not limited to the LSI, and the present invention may be realized on a dedicated circuit or a general purpose processor. For example, the present invention may be realized on an FPGA (Field Programmable Gate Array) being an LSI which can be programmed after manufacturing, or a reconfigurable processor being a LSI, reconfiguration of which could be made to the connection of internal circuit cells and settings. In addition, the computation performed by such structures may be performed by, for instance, a DSP (Digital Signal Processor), a CPU (Central Processing Unit) and or the like. Further, such processing steps may be recorded on a recording medium as a program, and may be realized by executing such a program.

Further in addition, if a new technology of circuit integration replacing that of the LSI emerges as a result of the progress made in the field of semiconductor technology or another technology deriving therefrom, the integration of function blocks may be performed applying such technology. At this point, there is a possibility of biotechnology being applied to induce the future development of circuit integration technology.

(14) Furthermore, combinations of the above-described embodiment and the modifications are construed as being included in the scope of the present invention.

1.7. Supplement (1) One aspect of the present invention is a content distribution system including a distribution server that distributes a program stream pertaining to program content and a playback apparatus that decodes and plays back the program stream, the distribution server and the playback apparatus being connected via a network, the distribution server comprising: a distribution unit that distributes, to the playback apparatus via the network, the program stream and a program state flag associated with the program stream, the program state flag indicating whether or not the program content is constituted of only 3D video, and the playback apparatus comprising: a reception unit that receives, from the distribution server, the program stream and the program state flag; a determination unit that determines, prior to decoding of the program stream, whether or not the program state flag indicates that the program content is constituted of only 3D video; and a playback unit that decodes the program stream and that performs control so as to play back the program stream as 3D video without determining whether or not each of frames included in the program stream is a 3D video frame when the determination unit determines that the program state flag indicates that the program content is constituted of only 3D video.

According to this structure, the distribution server of the content distribution system transmits the program stream and the program state flag to the playback apparatus. The playback apparatus decodes and plays back the program stream without determining whether or not each of the frames included in the program stream is a 3D video frame when determining, prior to decoding the program stream, that the program content corresponding to the program stream is constituted of only 3D video by using the program state flag. As such, when a program content constituted of only 3D video is distributed as a single distribution-target content in a content distribution service, the content distribution system inhibits the execution of the processing of determining whether or not each of the frames included in the program content is a 3D video frame.

(2) One aspect of the present invention is a playback apparatus that receives a program stream pertaining to program content from a distribution server connected thereto via a network and that decodes and plays back the program stream, the playback apparatus comprising: a reception unit that receives, from the distribution server via the network, the program stream and a program state flag associated with the program stream, the program state flag indicating whether or not the program content is constituted of only 3D video; a determination unit that determines, prior to decoding of the program stream, whether or not the program state flag indicates that the program content is constituted of only 3D video; and a playback unit that decodes the program stream and that performs control so as to play back the program stream as 3D video without determining whether or not each of frames included in the program stream is a 3D video frame when the determination unit determines that the program state flag indicates that the program content is constituted of only 3D video.

According to this structure, the playback apparatus decodes and plays back the program stream without determining whether or not each of the frames included in the program stream is a 3D video frame when determining, prior to decoding the program stream, that the program content corresponding to the program stream is constituted of only 3D video by using the program state flag. As such, when program content is constituted of only 3D video, the playback apparatus inhibits the execution of the processing of determining whether or not each of the frames included in the program content is a 3D video frame.

(3) In the playback apparatus, each of the frames included in the program stream may be associated with a piece of identification information, a piece of identification information associated with a given frame indicating whether the frame is a 3D video frame or a 2D video frame, and when the determination unit determines that the program state flag indicates that the program content is not constituted of only 3D video, the playback unit may decode the program stream, refer to a corresponding piece of identification information for each of the frames included in the program stream, and (i) when a given frame is a 2D video frame, perform control so as to play back the frame as 2D video and (ii) when a given frame is a 3D video frame, perform control so as to play back the frame as 3D video.

According to this structure, when determining that the program stream is not constituted of only 3D video prior to decoding the program stream, the playback apparatus can perform control so as to appropriately play back each of the frames included in the program stream according to whether a given frame is a 2D video frame or a 3D video frame by using the identification information associated with the frame.

(4) In addition, one aspect of the present invention is a distribution server that distributes a program stream pertaining to program content to a playback apparatus connected thereto via a network, the playback apparatus decoding and playing back the program stream, the distribution server comprising: a distribution unit that distributes, to the playback apparatus via the network, the program stream and a program state flag associated with the program stream, the program state flag indicating whether or not the program content is constituted of only 3D video.

According to this structure, the distribution server transmits the program state flag indicating whether or not the program content is constituted of only 3D video to the playback apparatus. Hence, the playback apparatus is able to determine whether or not the program content is constituted of only 3D video by referring to the program state flag. Further, when determining that the program content is constituted of only 3D video, the playback apparatus decodes and plays back the program stream without determining whether or not each of the frames included in the program stream is a 3D video frame. As such, the execution of the processing of determining whether or not each of the frames included in the program content is a 3D video frame is inhibited when the program content is constituted of only 3D video.

The above-described content distribution system is useful in the distribution and playback of content including either one of 3D or 2D video and content including both 3D and 2D video.

REFERENCE SIGNS LIST 1 content distribution system
2 network
100 digital television
101 content output device
102 display device
110 TS buffer
111 encoded video buffer
112 decoded video buffer
113 input/output unit
114 demultiplexer
115 video decoder
116 audio decoder
117 playback controlling unit
118 output processing unit
119 user operation controlling unit
120 frame buffer
121 video processing unit
122 output controlling unit
125 program determining unit
126 initial frame determining unit
130 first buffer
131 second buffer
132 L image buffer
133 R image buffer
140 switch controlling unit
141 output unit
142 switch
200 3D glasses
300 distribution server
301 content storing unit
302 distribution controlling unit
303 input/output unit

The invention claimed is:

1. A content distribution system including a distribution server that distributes a program stream pertaining to program content and a playback apparatus that decodes and plays back the program stream, the distribution server and the playback apparatus being connected via a network, the distribution server comprising:
a distribution unit that distributes, to the playback apparatus via the network, the program stream, a program state flag, and a reference/non-reference flag, the program state flag being associated with the program content and indicating whether or not one or more of video frames included in the program stream is a 3D video frame, the reference/non-reference flag indicating whether or not reference is to be made to pieces of identification information associated with the video frames, a piece of identification information associated with a given video frame indicating whether the video frame is a 3D video frame or a 2D video frame, and the playback apparatus comprising:
a reception unit that receives, from the distribution server, the program stream the program state flag, and the reference/non-reference flag;
a first determination unit that determines, prior to decoding of the program stream, whether or not the program state flag indicates that one or more of the video frames included in the program stream is a 3D video frame ;
a second determination unit that determines, by using the reference/non-reference flag, whether or not reference is to be made to the pieces of identification information associated with the video frames, the determination being performed prior to decoding of the program stream and when determined by the first determination unit that the program state flag indicates that one or more of the video frames included in the program stream is a 3D video frame; and
a playback unit that (i) when the second determination unit determines that reference is not to be made to the pieces of identification information associated with the video frames, decodes the program stream and performs control so as to play back the program stream as 3D video without determining whether or not each of the video frames included in the program stream is a 3D video frame, and that (ii) when the second determination unit determines that reference is to be made to the pieces of identification information associated with the video frames, decodes the program stream, checks whether or not each of the video frames included in the program stream is a 3D video frame by referring to a piece of identification information associated with the video frame, and performs control so as to play back the video frame in accordance with a result of the check, wherein
the program state flag and the reference/non-reference flag are contained in a playback control file that is separate from the program stream,
the distribution unit distributes the program state flag and the reference/non-reference flag by distributing the playback control file, the distribution unit distributing the program state flag and the reference/non-reference flag before distributing the program stream, and
the reception unit receives the program state flag and the reference/non-reference flag by receiving the playback control file, the reception unit receiving the program state flag and the reference/non-reference flag before receiving the program stream.

2. A playback apparatus that receives a program stream pertaining to program content from a distribution server connected thereto via a network and that decodes and plays back the program stream, the playback apparatus comprising:
a reception unit that receives, from the distribution server via the network, the program stream, and a program state flag, and a reference/non-reference flag, the program state flag being associated with the program content and indicating whether or not one or more of video frames included in the program stream is a 3D video frame, the reference/non-reference flag indicating whether or not reference is to be made to pieces of identification information associated with the video frames, a piece of identification information associated with a given video frame indicating whether the video frame is a 3D video frame or a 2D video frame;

a first determination unit that determines, prior to decoding of the program stream, whether or not the program state flag indicates that one or more of the video frames included in the program stream is a 3D video frame;

a second determination unit that determines, by using the reference/non-reference flag, whether or not reference is to be made to the pieces of identification information associated with the video frames, the determination being performed prior to decoding of the program stream and when determined by the first determination unit that the program state flag indicates that one or more of the video frames included in the program stream is a 3D video frame; and a playback unit that (i) when the second determination unit determines that reference is not to be made to the pieces of identification information associated with the video frames, decodes the program stream and performs control so as to play back the program stream as 3D video without determining whether or not each of the video frames included in the program stream is a 3D video frame, and that (ii) when the second determination unit determines that reference is to be made to the pieces of identification information associated with the video frames, decodes the program stream, checks whether or not each of the video frames included in the program stream is a 3D video frame by referring to a piece of identification information associated with the video frame, and performs control so as to play back the video frame in accordance with a result of the check, wherein the program state flag and the reference/non-reference flag are contained in a playback control file that is separate from the program stream, and the reception unit receives the program state flag and the reference/non-reference flag by receiving the playback control file, the reception unit receiving the program state flag and the reference/non-reference flag before receiving the program stream.

3. The playback apparatus of claim 2, wherein when the program state flag does not indicate that one or more of the video frames included in the program stream is a 3D video frame, the playback unit decodes the program stream and performs control so as to playback all the video frames included in the program stream as 2D video without making reference to the pieces of identification information associated with the video frames.

4. A playback method used in a playback apparatus that receives a program stream pertaining to program content from a distribution server connected thereto via a network and that decodes and plays back the program stream, the playback method comprising:

a reception step of receiving, from the distribution server via the network, the program stream, and a program state flag, and a reference/non-reference flag, the program state flag being associated with the program content and indicating whether or not one or more of video frames included in the program stream is a 3D video frame, the reference/non-reference flag indicating whether or not reference is to be made to pieces of identification information associated with the video frames, a piece of identification information associated with a given video frame indicating whether the video frame is a 3D video frame or a 2D video frame;

a first determination step of determining, prior to decoding of the program stream, whether or not the program state flag indicates that one or more of the video frames included in the program stream is a 3D video frame;

a second determination step of determining, by using the reference/non-reference flag, whether or not reference is to be made to the pieces of identification information associated with the video frames, the determination being performed prior to decoding of the program stream and when determined in the first determination step that the program state flag indicates that one or more of the video frames included in the program stream is a 3D video frame; and a playback step of (i) when determined in the second determination step that reference is not to be made to the pieces of identification information associated with the video frames, decodes the program stream and performs control so as to play back the program stream as 3D video without determining whether or not each of the video frames included in the program stream is a 3D video frame, and that (ii) when determined in the second determination step that reference is to be made to the pieces of identification information associated with the video frames, decodes the program stream, checks whether or not each of the video frames included in the program stream is a 3D video frame by referring to a piece of identification information associated with the video frame, and performs control so as to play back the video frame in accordance with a result of the check, wherein the program state flag and the reference/non-reference flag are contained in a playback control file that is separate from the program stream, and the program state flag and the reference/non-reference flag are received in the reception step by receiving the playback control file, the program state flag and the reference/non-reference flag being received before the program stream is received.

\* \* \* \* \*